United States Patent
Balon et al.

(10) Patent No.: US 6,574,636 B1
(45) Date of Patent: Jun. 3, 2003

(54) METHOD AND ARTICLE OF MANUFACTURE FOR ISOLATING DATA WITHIN A COMPUTER PROGRAM

(75) Inventors: Richard E. Balon, Wheaton, IL (US); Asif F. Malik, Chicago, IL (US); Jeffrey M. Wargin, Chicago, IL (US); Michael A. Jackowski, Crystal Lake, IL (US); Richard C. Kennedy, Chicago, IL (US); Eduardo Navickas, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/305,816

(22) Filed: May 4, 1999

(51) Int. Cl.$^7$ .............................................. G06F 17/30
(52) U.S. Cl. .......................... 707/103; 707/100; 717/1; 711/144
(58) Field of Search ............................... 707/103, 100; 711/143, 144; 717/1

(56) References Cited

U.S. PATENT DOCUMENTS

| | | | |
|---|---|---|---|
| 5,191,522 A | 3/1993 | Bosco et al. .................... 705/4 |
| 5,241,664 A | 8/1993 | Ohba et al. ................... 395/425 |
| 5,592,611 A | * 1/1997 | Midgely et al. ........ 395/182.02 |
| 5,655,085 A | 8/1997 | Ryan et al. ................... 364/401 |
| 5,664,109 A | 9/1997 | Johnson et al. ................ 705/2 |
| 5,671,360 A | 9/1997 | Hambrick et al. .......... 395/209 |
| 5,724,575 A | 3/1998 | Hoover et al. ................ 707/10 |
| 5,758,351 A | 5/1998 | Gibson et al. .............. 707/104 |
| 5,768,506 A | 6/1998 | Randell ........................ 709/202 |
| 5,826,239 A | 10/1998 | Du et al. ........................ 705/8 |
| 5,836,011 A | 11/1998 | Hambrick et al. .......... 395/208 |
| 5,950,169 A | 9/1999 | Borghesi et al. ............... 705/4 |
| 5,956,687 A | 9/1999 | Wamsley et al. .............. 705/1 |
| 5,987,247 A | 11/1999 | Lau ................................ 717/2 |
| 6,023,578 A | 2/2000 | Brisan et al. ................... 717/2 |
| 6,038,590 A | * 3/2000 | Gish .......................... 709/203 |
| 6,061,665 A | * 5/2000 | Bahreman ..................... 705/40 |
| 6,070,152 A | * 5/2000 | Carey et al. .................. 705/35 |
| 6,076,066 A | 6/2000 | Dirienzon et al. ............. 705/4 |
| 6,078,890 A | 6/2000 | Mangin et al. ................ 705/2 |
| 6,131,155 A | 10/2000 | Alexander et al. .......... 712/207 |
| 6,151,660 A | 11/2000 | Aoki .......................... 711/129 |
| 6,158,044 A | 12/2000 | Tibbets .......................... 707/1 |
| 6,163,781 A | 12/2000 | Wess, Jr. .................... 707/103 |
| 6,182,274 B1 | * 1/2001 | Lau ................................ 717/1 |

FOREIGN PATENT DOCUMENTS

WO    WO-200067182 A2    11/2000    ................... 705/7

OTHER PUBLICATIONS

"Primavera Products and solutions," www.primavera.com/products/p3.html, downloaded from internet Feb. 2, 2001, 2 pages.
Primavera Extends Lead in High–End Project Management Softeware, Business Wire, Apr. 4, 1995, 3 pages.
Greg Todd, et al. Microsoft Exchange Server 5.5.

* cited by examiner

Primary Examiner—Greta L. Robinson
(74) Attorney, Agent, or Firm—Brinks Hofer Gilson & Lione

(57) ABSTRACT

A computer program is provided for developing a component based software package. The program includes a data component that stores, retrieves and manipulates data utilizing a plurality of functions. Also provided is an adapter component that transmits and receives data to/from the data component. A business component is included that serves as a data cache and includes logic for manipulating the data. A controller component is also included which is adapted to handle events generated by a user utilizing the business component to cache data and the adapter component to ultimately persist data to a data repository.

20 Claims, 12 Drawing Sheets

METHOD AND ARTICLE OF MANUFACTURE FOR ISOLATING DATA WITHIN A COMPUTER PROGRAM

FIELD OF THE INVENTION

The present invention relates to isolating data in a computer program and more particularly to compartmentalizing a computer program for preventing unauthorized access to data by isolating the same.

BACKGROUND OF THE INVENTION

Computers have become a necessity in life today. They appear in nearly every office and household worldwide. A representative hardware environment is depicted in prior art FIG. 1, which illustrates a typical hardware configuration of a workstation having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system.

Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

SUMMARY OF THE INVENTION

A computer program is provided for developing a component based software package. The program includes a data component that stores, retrieves and manipulates data utilizing a plurality of functions. Also provided is an adapter component that transmits and receives data to/from the data component. A business component is included that serves as a data cache and includes logic for manipulating the data. A controller component is also included which is adapted to handle events generated by a user utilizing the business component to cache data and the adapter component to ultimately persist data to a data repository.

DESCRIPTION OF THE DRAWINGS

The foregoing and other objects, aspects and advantages are better understood from the following detailed description of a preferred embodiment of the invention with reference to the drawings, in which.

Prior Art

DISCLOSURE OF THE INVENTION

Figure 1:
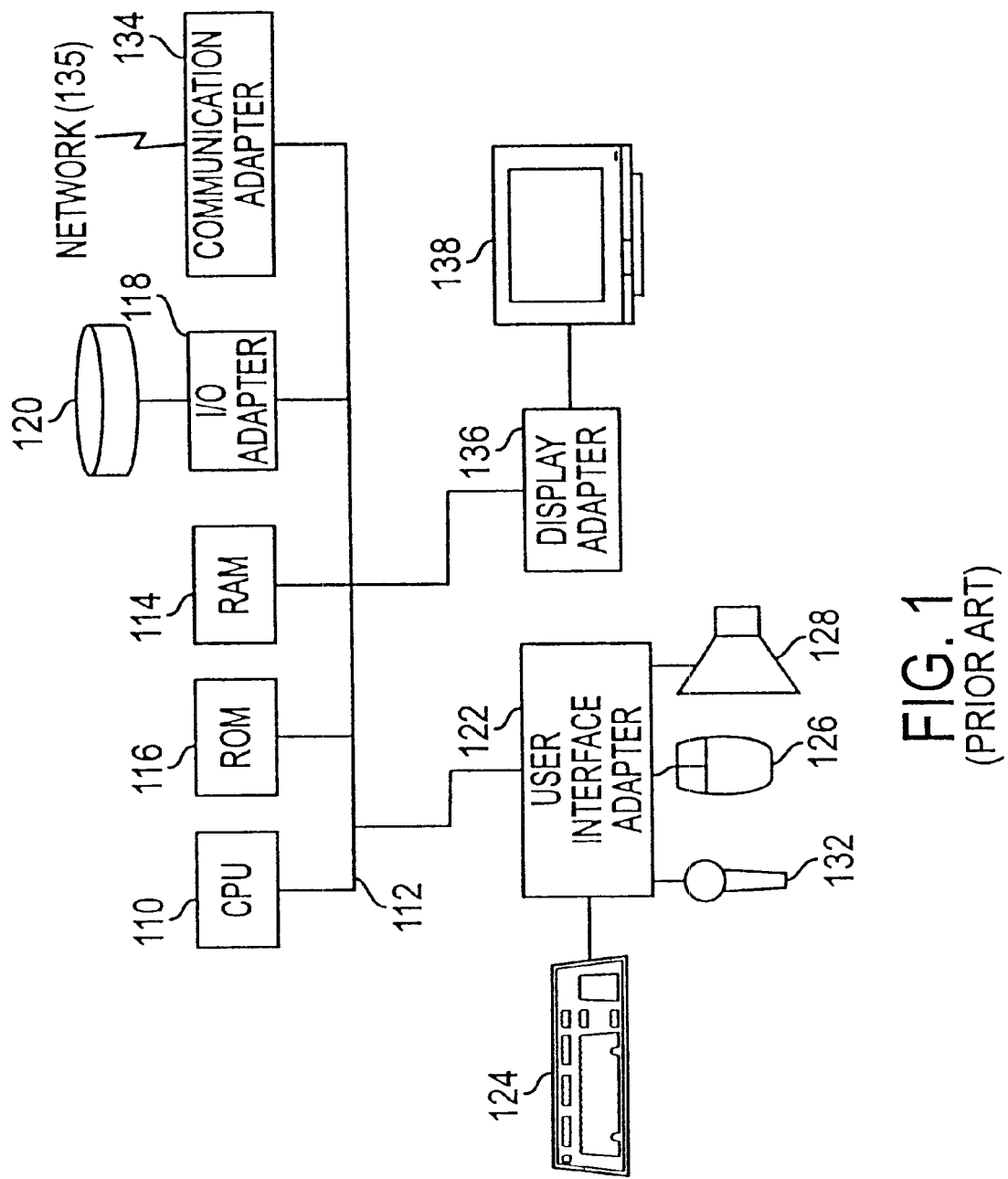
FIG. 1 is a schematic diagram of the present invention.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2,1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

DETAILED DESCRIPTION

Figure 2A:
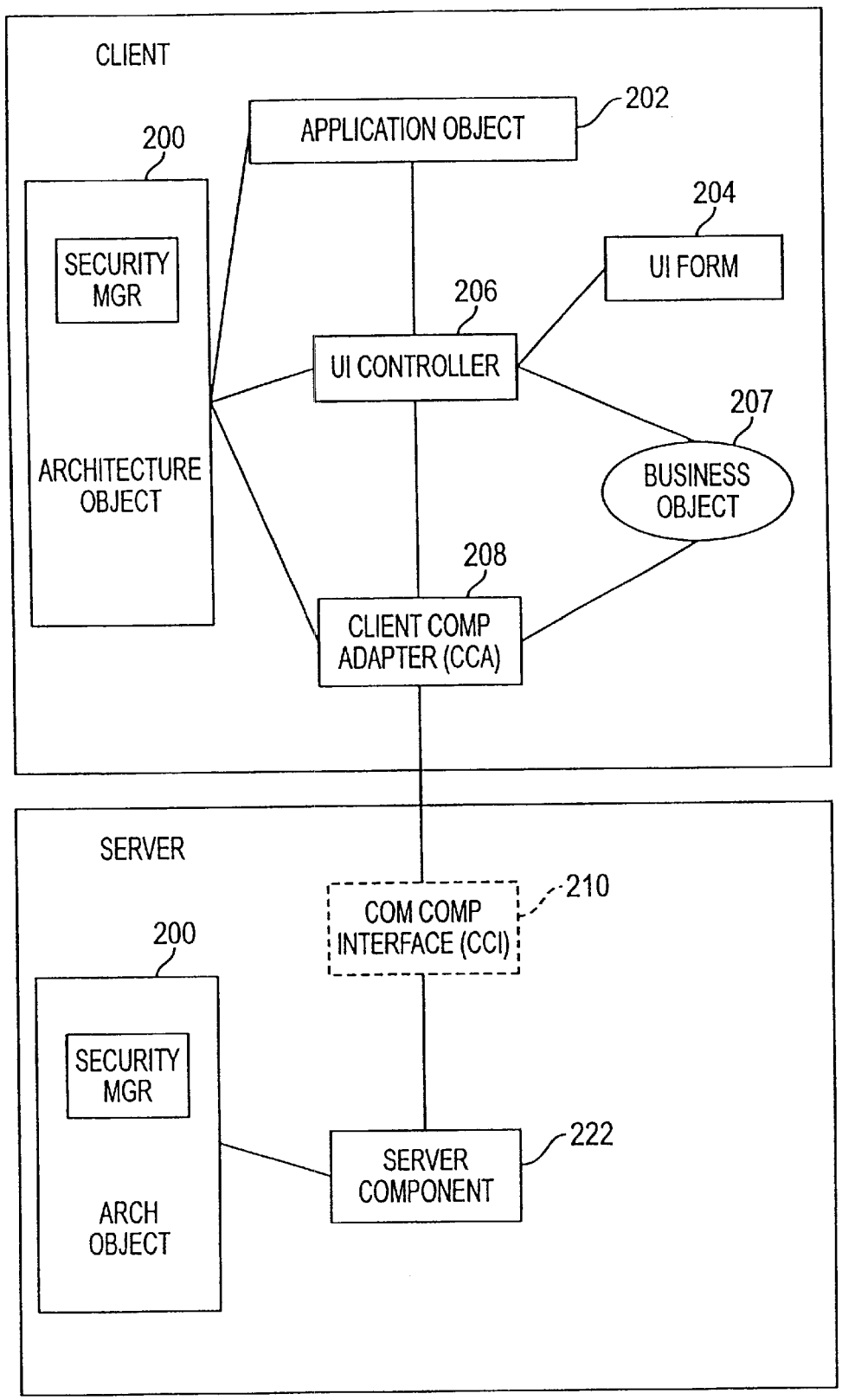
FIG. 2A is block diagram of one embodiment of the present invention.

One embodiment of the present invention is a server based framework utilizing component based architecture. Referring to FIG. 2A, one embodiment of the present invention includes an Architecture Object 200, an Application Object 202, a User Interface Form 204, a User Interface Controller 206, a Client Component Adapter 208, a COM Component Interface 210, and a Server Component 222.

Figure 2B:
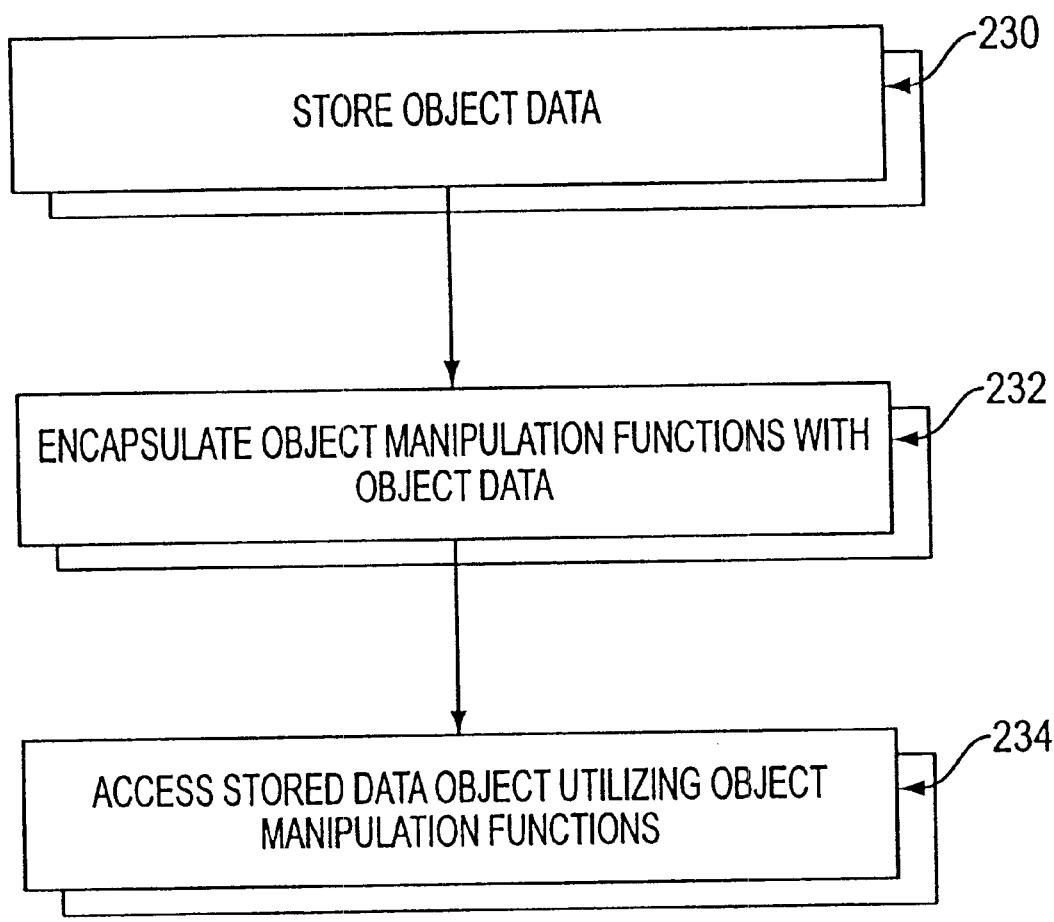
FIG. 2B is a flowchart showing how components generally operate in accordance with one embodiment of the present invention.

In general, the components of the present invention operate as shown in FIG. 2B. In step 230, data is stored in an object of the component. In step 232, functions which manipulate the object are encapsulated with the object data. Later, in step 234, the stored object data can be manipulated by other components utilizing the functions of step 232.

Architecture Object

The Architecture Object 200 provides an easy-to-use object model that masks the complexity of the architecture on the client. The Architecture Object 200 provides purely technical services and does not contain any business logic or functional code. It is used on the client as the single point of access to all architecture services.

On the server side, the Architecture Object 200 is supplemented by a set of global functions contained in standard VB modules The Architecture Object 200 is responsible for providing all client architecture services (i.e., codes table access, error logging, etc.), and a single point of entry for architecture services. The Architecture Object 200 is also responsible for allowing the architecture to exist as an autonomous unit, thus allowing internal changes to be made to the architecture with minimal impact to application.

The Architecture Object 200 provides a code manager, client profile, text manager, ID manager, registry manager, log manager, error manager, and a security manager. The codes manager reads codes from a local database on the client, marshals the codes into objects, and makes them available to the application. The client profile provides information about the current logged-in user. The text manager provides various text manipulation services such as search and replace. The ID manager generates unique IDs and timestamps. The registry manager encapsulates access to the system registry. The log manager writes error or informational messages to the message log. The error manager provides an easy way to save and re-raise an error. And the security manager determines whether or not the current user is authorized to perform certain actions.

Application Object

The Application Object 202 has a method to initiate each business operation in the application. It uses late binding to instantiate target UI controllers in order to provide autonomy between windows. This allows different controllers to use the Application Object 202 without statically linking to each and every UI controller in the application.

When opening a UI controller, the Application Object 202 calls the architecture initialization, class initialization, and form initialization member functions.

The Application Object 202 keeps a list of every active window, so that it can shut down the application in the event of an error. When a window closes, it tells the Application Object 202, and is removed from the Application Object's 202 list of active windows.

The Application Object 202 is responsible for instantiating each UI Controller 206, passing data/business context to the target UI Controller 206, and invoking standard services such as initialize controller, initializing Form and Initialize Architecture. The Application Object 202 also keeps track of which windows are active so that it can coordinate the shutdown process.

UI Form

The UI form's 204 primary responsibility is to forward important events to its controller 206. It remains mostly unintelligent and contains as little logic as possible. Most event handlers on the form simply delegate the work by calling methods on the form's controller 206.

The UI form 204 never enables or disables its own controls, but ask its controller 206 to do it instead. Logic is included on the UI form 204 only when it involves very simple field masking or minor visual details.

The UI form 204 presents an easy-to-use, graphical interface to the user and informs its controller 206 of important user actions. The UI form 204 may also provide basic data validation (e.g., data type validation) through input masking. In addition, the UI form is responsible for intelligently resizing itself, launching context-sensitive help, and unload itself.

User Interface Controller

Every UI Controller 206 includes a set of standard methods for initialization, enabling and disabling controls on its UI form 204, validating data on the form, getting data from the UI form 204, and unloading the UI form 204.

UI Controllers 206 contain the majority of logic to manipulate Business Objects 207 and manage the appearance of its UI form 204. If its form is not read-only, the UI Controller 206 also tracks whether or not data on the UI form 204 has changed, so as to avoid unnecessary database writes when the user decides to save. In addition, controllers of auxiliary windows (like the File-Save dialog box in Microsoft Word), keep track of their calling UI controller 206 so that they can notify it when they are ready to close.

Figure 2C:
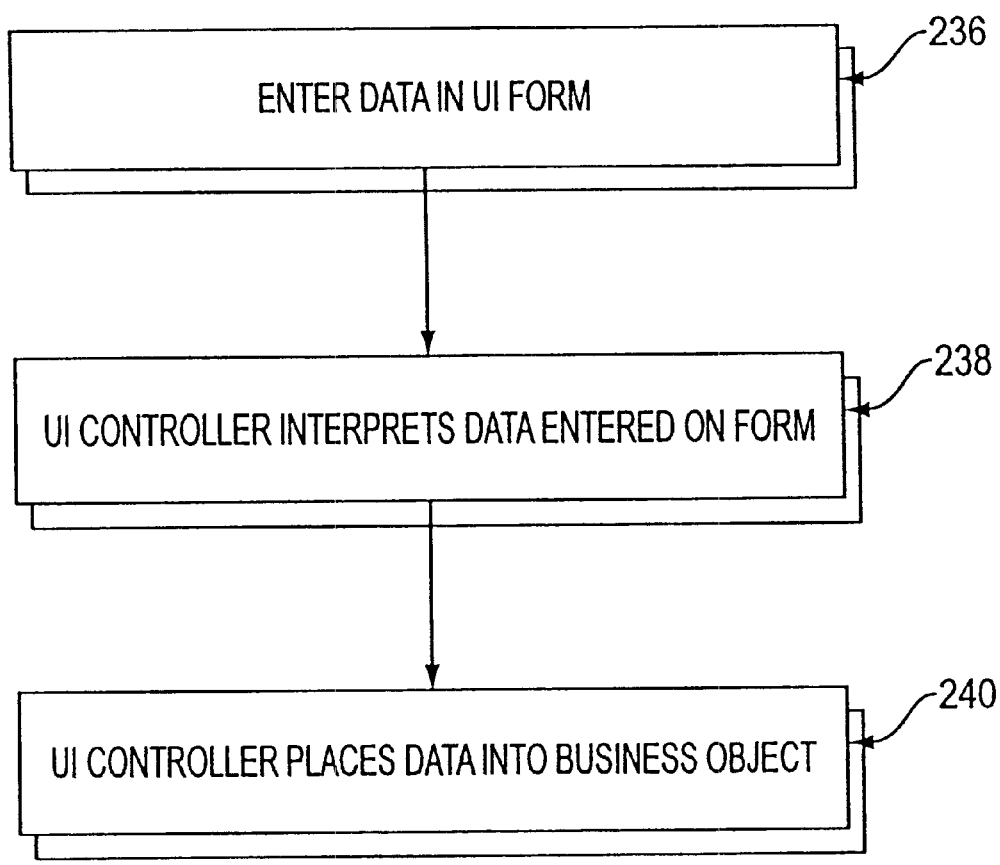
FIG. 2C is a flowchart showing how the UI Controller operates in accordance with one embodiment of the present invention.

FIG. 2C is a flowchart showing how the UI Controller operates in one embodiment of the present invention. In step 236, data is entered in a UI form by a user. In step 238, the UI controller interprets the data entered into the UI form. In step 240, the UI controller places the appropriate data into a Business Object to be utilized and retrieved later.

A UI Controller 206 defines a Logical Unit of Work (LUW). If an LUW involves more than one UI Controller 206, the LUW is implemented as a separate object.

The UI Controller 206 is responsible for handling events generated by the user interacting with the UI form 204 and providing complex field validation and cross field validation within a Logical Unit of Work. The UI Controller 206 also contains the logic to interact with business objects 207, and creates new business objects 207 when necessary. Finally, the UI Controller 206 interacts with Client Component Adapters 208 to add, retrieve, modify, or delete business objects 207, and handles all client-side errors.

Business Objects

The Business Object's (BO) 207 primary functionality is to act as a data holder, allowing data to be shared across User Interface Controllers 206 using an object-based programming model.

BOs 207 perform validation on their attributes as they are being set to maintain the integrity of the information they contain. BOs 207 also expose methods other than accessors to manipulate their data, such as methods to change the life cycle state of a BO 207 or to derive the value of a calculated attribute.

In many cases, a BO 207 will have its own table in the database and its own window for viewing or editing operations.

Business Objects 207 contain information about a single business entity and maintain the integrity of that information. The BO 207 encapsulates business rules that pertain to that single business entity and maintains relationships with other business objects (e.g., an insurance claim contains a collection of supplements). Finally, the BO 207 provides additional properties relating to the status of the information it contains (such as whether that information has changed or not), provides validation of new data when necessary, and calculates attributes that are derived from other attributes (such as Full Name, which is derived from First Name, Middle Initial, and Last Name).

Client Component Adapters

Client Component Adapters (CCAs) 208 are responsible for retrieving, adding, updating, and deleting business objects in the database. CCAs 208 hide the storage format and location of data from the UI controller 206. The UI controller 206 does not care about where or how objects are stored, since this is taken care of by the CCA 208.

The CCA 208 marshals data contained in recordsets returned by the server into business objects 207. CCAs 208 masks all remote requests from UI Controller 206 to a specific component, and act as a "hook" for services such as data compression, and data encryption.

COM Component Interface

A COM Component Interface (CCI) 210 is a "contract" for services provided by a component. By "implementing" an interface (CCI) 210, a component is promising to provide all the services defined by the CCI 20.

The CCI 210 is not a physical entity (which is why it is depicted with a dotted line). It's only reason for existence is to define the way a component appears to other objects. It includes the signatures or headers of all the public properties or methods that a component will provide.

To implement a CCI 210, a server component exposes a set of specially named methods, one for each method defined on the interface. These methods should do nothing except delegate the request to a private method on the component which will do the real work.

The CCI 210 defines a set of related services provided by a component. The CCI allows any component to "hide" behind the interface to perform the services defined by the interface by "implementing" the interface.

Server Component

Server components 222 are course grained and transaction oriented. They are designed for maximum efficiency.

Server Components 222 encapsulate all access to the database, and define business transaction boundaries. In addition, Server Components 222 are responsible for ensuring that business rules are honored during data access operations.

A Server Component 222 performs data access operations on behalf of CCAs 208 or other components and participates in transactions spanning server components 222 by communicating with other server components 222. The Server Component 222 is accessible by multiple front end personalities (e.g., Active Server Pages), and contains business logic designed to maintain the integrity of data in the database.

Figure 2D:
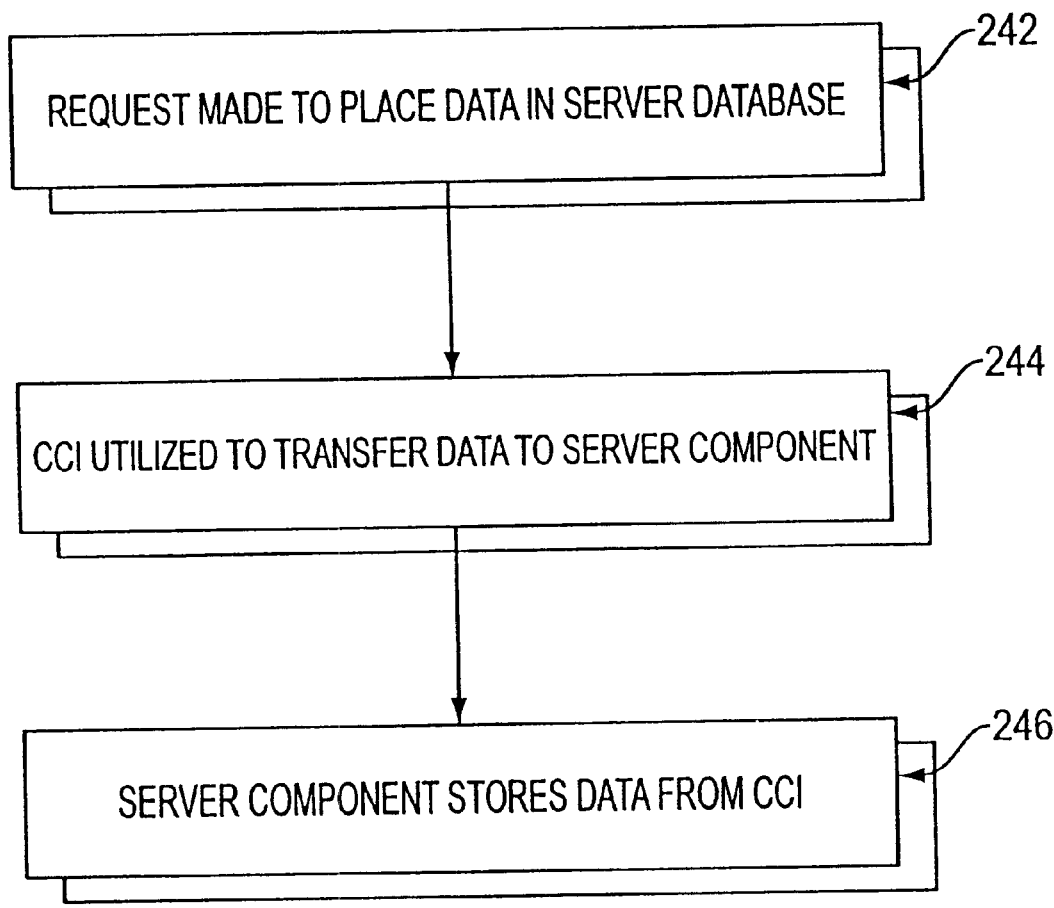
FIG. 2D is a flowchart showing the interactions between the CCA, the CCI, and the Server Component in accordance with one embodiment of the present invention.

FIG. 2D is a flowchart showing the interactions between the CCA, the CCI, and the Server Component in accordance with one embodiment of the present invention. In step 242, a request is made to place client created data on the server database. In step 244, the data is transferred to the server component 222 utilizing a CCI 210. In step 246, the server component 222 stores the data in the server database.

Business Rule Placement

Overview

The distribution of business rules across tiers of the application directly affects the robustness and performance of the system as a whole. Business rules can be categorized into the following sections: Relationships, Calculations, and Business Events.

Relationships between Business Objects

Business Objects 207 are responsible for knowing other business objects 207 with which they are associated.

Relationships between BOs 207 are built by the CCA 208 during the marshaling process. For example, when a CCA 208 builds an insurance claim BO 207, it will also build the collection of supplements if necessary.

Calculated Business Data

Business rules involving calculations based on business object 207 attributes are coded in the business objects 207 themselves. Participant Full Name is a good example of a calculated attribute. Rather than force the controllers to concatenate the first name, middle initial, and last name every time they wanted to display the full name, a calculated attribute that performs this logic is exposed on the business object. In this way, the code to compose the full name only has to be written once and can be used by many controllers 206.

Another example of a calculated attribute is the display date of a repeating task. When a task with a repeat rule is completed, a new display date must be determined. This display date is calculated based on the date the task was completed, and the frequency of repetition defined by the repeat rule. Putting the logic to compute the new display date into the Task BO 207 ensures that it is coded only once.

Responses to Business Events

Business rules that relate to system events and involve no user interaction are enforced on the server components.

Completion of a task is a major event in the system. When a task is completed, the system first ensures that the performer completing the task is added to the claim. Then, after the task is marked complete in the database, it is checked to see if the task has a repeat rule. If so, another task is created and added to the database. Finally, the event component is notified, because the Task Engine may need to react to the task completion.

Consider the scenario if the logic to enforce this rule were placed on the UI controller 206.

The controller 206 calls the Performer Component to see if the performer completing the task has been added to the claim. If the performer has not been added to the claim, then the controller 206 calls the performer component again to add them.

Next, the controller 206 calls the Task Component to mark the task complete in the database. If the task has a repeat rule, the controller 206 computes the date the task is to be redisplayed and calls the Task Component again to add a new task. Lastly, the controller 206 calls the Event Component to notify the Task Engine of the task completion.

The above implementation requires five network round trips in its worst case. In addition, any other controller 206 or server component 222 that wants to complete a task must code this logic all over again. Enforcing this rule in the task server component 222 reduces the number of network round trips and eliminates the need to code the logic more than once.

Responses to User Events

All responses to user events are coordinated by the controller 206. The controller 206 is responsible for actions such as enabling or disabling controls on its form, requesting authorization from the security component, or making calls to the CCA 208.

Authorization

All logic for granting authorization is encapsulated inside the security component. Controllers 206 and components 222 must ask the security component if the current user is authorized to execute certain business operations in the system. The security component will answer yes or no according to some predefined security logic.

Summary

| Type of Business Rule | Example | Responsibility |
|---|---|---|
| Maintaining relationships between BOs | Claim keeps a collection of supplements | Business Objects |
| Building relationships between BOs | CCA builds the claim's collection of supplements | CCAs |
| Calculated Business Data | Participant calculates its full name | Business Objects |
| Responses to Business Events | Task Component collaborates with other components | Components |
| Requesting Authorization | Task Library controller asks the securitycomponent if the current user is allowed to access Task Library | Controllers and Components |
| Granting Authorization | Security component determines whether or not the current user can access Task Library | Security Component |

Window Processing Framework

The Default Window Framework provides default window processing for each window contained within the system. This default processing aides the developer in developing robust, maintainable UIs, standardizes common processes (such as form initialization) and facilitates smooth integration with architecture services.

Figure 3:
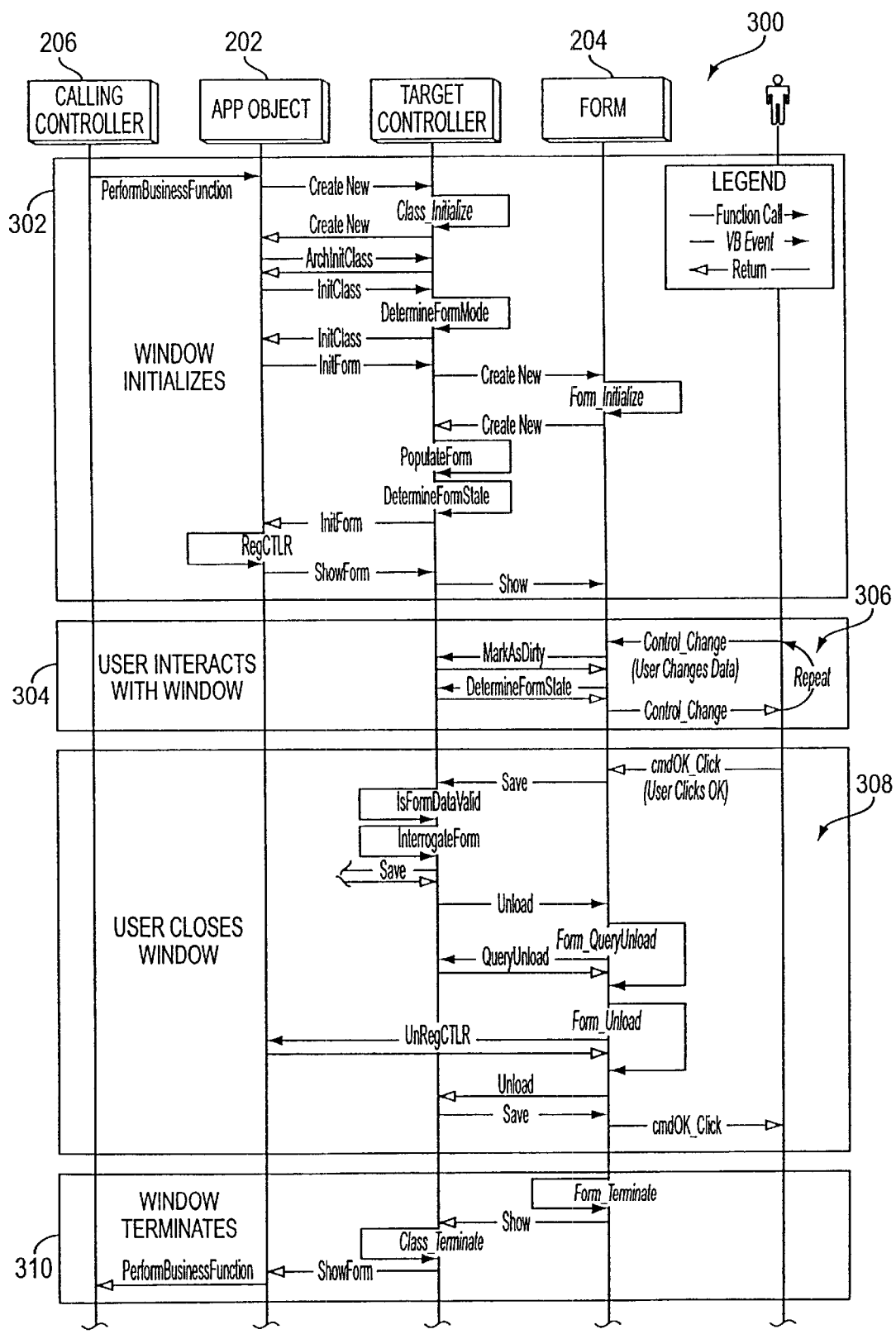
FIG. 3 shows the life cycle of a typical User Interface and the standard methods that are part of the Window Processing Framework.

FIG. 3 shows the life cycle of a typical User Interface and the standard methods that are part of the Window Processing Framework 300.

The Window Processing Framework 300 encompasses the following:

Window Initialization 302;
Window Save Processing 304;
Window Control State Management 306;
Window Data Validation 308;
Window Shutdown Processing 310.

Window Initialization Processing 302: After creating a controller 206 for the desired window, the App object 202 calls a set of standard initialization functions on the controller 206 before the form 204 is displayed to the user. Standardizing these functions makes the UIs more homogeneous throughout the application, while promoting good functional decomposition.

Window Save Processing 304: Any time a user updates any form text or adds an item to a ListBox, the UI Controller 206 marks the form as "dirty". This allows the UI controller 206 to determine whether data has changed when the form closes and prompt the user to commit or lose their changes.

Window Control State Management 306: Enabling and disabling controls and menu options is a very complex part of building a UI. The logic that modifies the state of controls is encapsulated in a single place for maintainability.

Window Data Validation 308: Whenever data changes on a form, validation rules can be broken. The controller is able to detect those changes, validate the data, and prompt the user to correct invalid entries.

Window Shutdown Processing 310: The Window Shutdown framework provides a clear termination path for each UI in the event of an error. This reduces the chance of memory leaks, and General Protection failures.

Benefits

Standardized Processing: Standardizing the window processing increases the homogeneity of the application. This ensures that all windows within the application behave in a consistent manner for the end users, making the application easier to use. It also shortens the learning curve for developers and increases maintainability, since all windows are coded in a consistent manner.

Simplified Development: Developers can leverage the best practices documented in the window processing framework to make effective design and coding decisions. In addition, a shell provides some "canned" code that gives developers a head start during the coding effort.

Layered Architecture: Because several architecture modules provide standardized processing to each application window, the core logic can be changed for every system window by simply making modifications to a single procedure.

Window Initialization 302

To open a new window, the App Object 202 creates the target window's controller 206 and calls a series of methods on the controller 206 to initialize it. The calling of these methods, ArchInitClass, InitClass, InitForm, and ShowForm, is illustrated below.

ArchInitClass

The main purpose of the ArchInitClass function is to tell the target controller 206 who is calling it. The App Object 202 "does the introductions" by passing the target controller 206 a reference to itself and a reference to the calling controller 206. In addition, it serves as a hook into the controller 206 for adding architecture functionality in the future.

```
Public Sub ArchInitClass(objApp As Object, objCallingCTLR As
    Object)
    ' remember who called me
    Set m_objApp = objApp
    Set m_objCallingCTLR = objCallingCTLR
End Sub
```

InitClass

This function provides a way for the App Object 202 to give the target controller 206 any data it needs to do its processing. It is at this point that the target controller 206 can determine what "mode" it is in. Typical form modes include, add mode, edit mode, and view mode. If the window is in add mode, it creates a new BO 207 of the appropriate type in this method.

```
Public Sub InitClass(colPrevSelection As CArchCollection)
    If colPrevSelection Is Nothing Then
        ' no accounts were previously selected
        Set m_colPrevSelection = New CArchCollection
        Set m_colNewSelection = New CArchCollection
    Else
        ' some accounts may have already been selected
        Set m_colPrevSelection = colPrevSelection
        Set m_colNewSelection = colPrevSelection.Clone()
```

```
    End If
    Set m_colResults = New CArchCollection
    DetermineFormMode ()
End Sub
```

InitForm

The InitForm procedure of each controller 206 coordinates any initialization of the form 204 before it is displayed. Because initialization is often a multi-step process, InitForm creates the window and then delegates the majority of the initialization logic to helper methods that each have a single purpose, in order to follow the rules of good functional decomposition. For example, the logic to determine a form's 204 state based on user actions and relevant security restrictions and move to that state is encapsulated in the DetermineFormState method.

```
Public Sub InitForm()
    ' create my form
    Set m_frmCurrentForm = New frmAccountSearch
    ' figure out the state of my form based on arguments I
    received in InitClass and
    ' enable/disable the appropriate controls
    DetermineFormState ()
    ' fill my form with data
    PopulateForm ()
End Sub
```

PopulateForm

PopulateForm is a private method responsible for filling the form with data during initialization. It is called exactly once by the InitForm method. PopulateForm is used to fill combo boxes on a form 204, get the details of an object for an editing window, or display objects that have already been selected by the user, as in the following example.

```
Private Sub PopulateForm()
    Dim acct As CAccount
    Dim item As GTListItem
    ' display any accounts already selected by the user
    ' create and add a ListItem for every Account in the
    previous selection collection
    With frmCurrentForm.lvwResults.ListItems
        .Clear
        For Each acct In m_colPrevSelection
            Set item = .Add(, acct.Number, acct.Number)
            item.SubItems(1) = acct.Name
        Next
    End With
End Sub
```

ShowForm

The ShowForm method simply centers and displays the newly initialized form 204.

```
Public Sub ShowForm()
    ' center my form
    frmCurrentForm.Move (Screen.Width - frmCurrentForm.Width) /
    2,_
                        (Screen.Height - frmCurrentForm.Height)
    / 2
    ' display my form
    frmCurrentForm. Show vbModal
End Sub
```

Window Control State Management 306

It is often necessary to enable or disable controls on a form 204 in response to user actions. This section describes the patterns employed by the Component Based Architecture for MTS (CBAM) to manage this process effectively.

Form Mode

It is helpful to distinguish between form mode and form state. Form mode indicates the reason the form 204 has been invoked. Often, forms 204 are used for more than one purpose. A common example is the use of the same form to view, add, and edit a particular type of object, such as a task or a claim. In this case, the form's modes would include View, Add, and Update.

The modes of a form 204 are also used to comply with security restrictions based on the current user's access level. For example, Task Library is a window that limits access to task templates based on the current user's role. It might have a Librarian mode and a Non-Librarian mode to reflect the fact that a non-librarian user cannot be allowed to edit task templates. In this way, modes help to enforce the requirement that certain controls on the form 204 remain disabled unless the user has a certain access level.

It is not always necessary for a form 204 to have a mode; a form might be so simple that it would have only one mode - the default mode. In this case, even though it is not immediately necessary, it may be beneficial to make the form "mode-aware" so that it can be easily extended should the need arise.

Form State

A form 204 will have a number of different states for each mode, where a state is a unique combination of enabled/disabled, visible/invisible controls. When a form 204 moves to a different state, at least one control is enabled or disabled or modified in some way.

A key difference between form mode and form state is that mode is determined when the controller 206 is initialized and remains constant until the controller 206 terminates. State is determined when the window initializes, but is constantly being reevaluated in response to user actions.

Handling UI Events

When the value of a control on the form 204 changes, it is necessary to reevaluate the state of the controls on the form (whether or not they are enabled/disabled or visible/invisible, etc.). If changing the value of one control could cause the state of a second control to change, an event handler is written for the appropriate event of the first control.

The following table lists common controls and the events that are triggered when their value changes.

| Control | Event |
| --- | --- |
| TextBox | Change |
| ComboBox | Change |
| ListBox | Click |
| CheckBox | Click |
| Option Button | Click |

The event handler calls the DetermineFormState method on the controller 206.

Setting the State of Controls

It is essential for maintainability that the process of setting the state of controls be separate from the process for setting the values of those controls. The DetermineFormState method on the controller 206 forces this separation between setting the state of controls and setting their values. DetermineFormState is the only method that modifies the state of any of the controls on the form 204. Because control state requirements are so complex and vary so widely, this is the only restriction made by the architecture framework.

If necessary, parameters are passed to the DetermineFormState function to act as "hints" or "clues" for determining the new state of the form 204. For complex forms, it is helpful to decompose the DetermineFormState function into a number of helper functions, each handling a group of related controls on the form or moving the form 204 to a different state.

EXAMPLE

The Edit/Add/View Task Window has three modes: Edit, Add, and View. In Add mode, everything on the form is editable. Some details will stay disabled when in Edit mode, since they should be set only once when the task is added. In both Add and Edit modes, the repeat rule may be edited. Enabling editing of the repeat rule always disables the manual editing of the task's due and display dates. In View mode, only the Category combo box and Private checkbox are enabled.

```
' Edit/Add/View Task Form
Private Sub txtName_Change( )
    myController.DetermineFormState
End Sub
' Edit/Add/View Task Controller
Public Sub DetermineFormState( )
    On Error Goto ErrorHandler
    Select Case m_nFormMode
        ' In Edit Mode, enable only "editable" details and
Repeat Rule editing if necessary
        Case cmFormModeEdit
            EnableAddDetails False
            EnableEditDetails True
            EnableViewDetails True
            If m_frmCurrentForm.chkRepetetiveTask.Checked Then
                EnableEditRepeatRule True
                EnableEditDisplayDueDates False
            Else
                EnableEditRepeatRule False
                EnableEditDisplayDueDates True
            End If
            If m_nFormDirty Then EnableSave True Else
EnableSave False
            ' In Add Node, enable all details and Repeat Rule
editing if necessary
        Case cmFormModeAdd
            EnableAddDetails True
            EnableEditDetails True
            EnableViewDetails True
            If m_frmCurrentForm.chkRepetetiveTask.Checked Then
                EnableEditRepeatRule True
                EnableEditDisplayDueDates False
            Else
                EnableEditRepeatRule False
                EnableEditDisplayDueDates True
            End If
            If m_nFormDirty Then EnableSave True Else
EnableSave False
            ' In View Mode, disable everything except a few
details
        Case cmFormModeView
            EnableAddDetails False
            EnableEditDetails False
            EnableViewDetails True
            EnableEditRepeatRule False
            EnableEditDisplayDueDates False
            EnableSave False
        Case Else
    End Select
    Exit Sub
```

```
ErrorHandler:
    ' error handling
End Sub
' Edit/Add/View Task Controller
Private Sub EnableAddDetails(bYesNo As Boolean)
    On Error Goto ErrorHandler
    ' Enable or disable controls that should be available only
when the task is being added.
    With frmCurrentForm
        .Name.Enabled = bYesNo
        .Description.Enabled = bYesNo
        .Type.Enabled = bYesNo
        .Level.Enabled = bYesNo
        .Source.Enabled = bYesNo
    End With
    Exit Sub
ErrorHandler:
    ' error handling logic
End Sub
```

Window Data Validation 308

Window data validation is the process by which data on the window is examined for errors, inconsistencies, and proper formatting. It is important, for the sake of consistency, to implement this process similarly or identically in all windows of the application.

Types of Validation

Input Masking

Input masking is the first line of defense. It involves screening the data (usually character by character) as it is entered, to prevent the user from even entering invalid data. Input masking may be done programmatically or via a special masked text box, however the logic is always located on the form, and is invoked whenever a masked field changes.

Single-Field Range Checking

Single-field range checking determines the validity of the value of one field on the form by comparing it with a set of valid values. Single-field range checking may be done via a combo box, spin button, or programmatically on the form, and is invoked whenever the range-checked field changes.

Cross-Field Validation

Cross-field validation compares the values of two or more fields to determine if a validation rule is met or broken, and occurs just before saving (or searching). Cross-field validation may be done on the Controller 206 or the Business Object 207, however it is preferable to place the logic on the Business Object 207 when the validation logic can be shared by multiple Controllers 206.

Invalid data is caught and rejected as early as possible during the input process. Input masking and range checking provide the first line of defense, followed by cross-field validation when the window saves (or searches).

Single-Field Validation

All single-field validation is accomplished via some sort of input masking. Masks that are attached to textboxes are used to validate the type or format of data being entered. Combo boxes and spin buttons may also be used to limit the user to valid choices. If neither of these are sufficient, a small amount of logic may be placed on the form's event handler to perform the masking functionality, such as keeping a value below a certain threshold or keeping apostrophes out of a textbox.

Cross-Field Validation

When the user clicks OK or Save, the form calls the IsFormDataValid on the controller to perform cross-field validation (e.g., verifying that a start date is less than an end date). If the business object 207 contains validation rules, the controller 206 may call a method on the business object 207 to make sure those rules are not violated.

If invalid data is detected by the controller 206, it will notify the user with a message box and, if possible, the indicate which field or fields are in error. Under no circumstances will the window perform validation when the user is trying to cancel.

Example

```
' Generic Edit Form
Private Sub cmdOK_Click( )
    On Error Goto ErrorHandler
    ' shut down if my data is valid.
    ' saving/canceling will occur in my controller's
QueryUnload function
    If IsFormDataValid Then Unload Me
    Exit Sub
ErrorHandler:
    Err.Raise Err.Number
End Sub
Public Function IsFormDatavalid( ) As Boolean
    On Error Goto ErrorHandler
    ' assume success
    IsFormDataValid = True
    ' evaluate all validation rules
    With frmCurrentForm
        make sure start date is earlier than end date
        If .txtStartDate.Text > .txtEndDate.Text Then
            IsFormDataValid = False
            MsgBox cmMsgInvalidEndDate
            .txtEndDate.SetFocus
        ElseIf . . .
            ' more validation rules
        End If
    End With
    Exit Function
ErrorHandler:
    ' error handling logic
End Function
```

Window Save Processing 304

Window "Save Processing" involves tracking changes to data on a form 204 and responding to save and cancel events initiated by the user.

Tracking Changes to Form Data

Each window within the CBAM application contains a field within its corresponding control object known as the dirty flag. The dirty flag is set to True whenever an end user modifies data within the window. This field is interrogated by the UI Controller 206 to determine when a user should be prompted on Cancel or if a remote procedure should be invoked upon window close.

The application shell provides standard processing for each window containing an OK or Save button.

Saving

The default Save processing is implemented within the UI Controller 206 as follows:

The UI Controller is Notified that the OK button has been clicked. Then the controller 206 checks its Dirty Flag. If flag is dirty, the controller 206 calls the InterrogateForm method to retrieve data from the form 204 and calls a server component 222 to store the business object 207 in the database. If the Dirty Flag is not set, then no save is necessary. The window is then closed.

Canceling

When the user cancels a window, the UI Controller 206 immediately examines the Dirty Flag. If the flag is set to true, the user is prompted that their changes will be lost if they decide to close the window.

Once prompted, the user can elect to continue to close the window and lose their changes or decide not to close and continue working.

Window Shutdown Processing 310

In the event of an error, it is sometimes necessary to shutdown a window or to terminate the entire application. It is critical that all windows follow the shutdown process in order to avoid the GPFs commonly associated with terminating incorrectly. Following is how the window/application is shutdown.

Shutdown Scope

The scope of the shutdown is as small as possible. If an error occurs in a controller 206 that does not affect the rest of the application, only that window is shut down. If an error occurs that threatens the entire application, there is a way to quickly close every open window in the application. The window shutdown strategy is able to accommodate both types of shutdowns.

Shutdown

In order to know what windows must be shut down, the architecture tracks which windows are open. Whenever the App Object 202 creates a controller 206, it calls its RegCTLR function to add the controller 206 to a collection of open controllers. Likewise, whenever a window closes, it tells the App Object 202 that it is closing by calling the App Object's 202 UnRegCTLR function, and the App Object 202 removes the closing controller 206 from its collection. In the case of an error, the App Object 202 loops through its collection of open controllers, telling each controller to "quiesce" or shutdown immediately.

GeneralErrorHandler

The GeneralErrorHandler is a method in MArch.bas that acts as the point of entry into the architecture's error handling mechanism. A component or a controller will call the GeneralErrorHandler when they encounter any type of unexpected or unknown error. The general error handler will return a value indicating what the component or controller should do: (1) resume on the line that triggered the error (2) resume on the statement after the line that triggered the error (3) exit the function (4) quiesce (5) shutdown the entire application.

```
ErrorHandler:
    Select Case CStr(Err.Number)
        handle a search with no result error
        Case cmErrNoClaimTreeData
            MsgBox cmMsgNoResultsQuery, vbInformation
            frmCurrentForm.StatusBar.Panels(1) =
cmNoResultsQuery
            'Sets mouse pointer back to default
            frmCurrentForm.MousePointer = vbDefault
        Case Else
            Dim nResumeCode As Integer
            nResumeCode =
GeneralErrorHandler(objApp.objArch.AsMsgStruct, cmController, cmClassName,
cmMethodName)
            Select Case CStr(nResumeCode)
                Case cmErrorResume
                    Resume
                Case cmErrorResumeNext
                    Resume Next
                Case cmErrorExit
                    Exit Sub
```

```
                Case cmErrorQuiesce
                    Quiesce
                Case Else
                    objApp.Shutdown
            End Select
    End Select
End Sub
```

In order to prevent recursive calls the GeneralErrorHandler keeps a collection of controllers that are in the process of shutting down. If it is called twice in a row by the same controller 206, it is able to detect and short-circuit the loop. When the controller 206 finally does terminate, it calls the UnRegisterError function to let the GeneralErrorHandler know that it has shut down and removed from the collection of controllers.

Shutdown Process

After being told what to do by the GeneralErrorHandler, the controller 206 in error may try to execute the statement that caused the error, proceed as if nothing happened, exit the current function, call its Quiesce function to shut itself down, or call the Shutdown method on the App Object 202 to shut the entire application down.

Additional Standard Methods

Searching

Controllers 206 that manage search windows have a public method named Find<Noun>s where <Noun> is the type of object being searched for. This method is called in the event handler for the Find Now button.

Saving

Any controller 206 that manages an edit window has a public method called Save that saves changes the user makes to the data on the form 204. This method is called by the event handlers for both the Save and OK buttons (when/if the OK button needs to save changes before closing).

Closing

A VB window is closed by the user in several ways: via the control-box in upper left corner, the X button in upper right corner, or the Close button. When the form closes, the only method that will always be called, regardless of the way in which the close was initiated, is the form's 204 QueryUnload event handler.

Because of this, there cannot be a standard Close method. Any processing that must occur when a window closes is to be done in the QueryUnload method on the controller 206 (which is called by the form's QueryUnload event handler).

The VB statement, Unload Me, appears in the Close button's event handler to manually initiate the unloading process. In this way, the Close button mimics the functionality of the control box and the X button, so that the closing process is handled the same way every time, regardless of how the user triggered the close. The OK button's event handler also executes the Unload Me statement, but calls the Save method on the controller first to save any pending changes.

Business Objects

Business Objects 207 are responsible for containing data, maintaining the integrity of that data, and exposing functions that make the data easy to manipulate. Whenever logic pertains to a single BO 207 it is a candidate to be placed on that BO. This ensures that it will not be coded once for each controller 206 that needs it. Following are some standard examples of business object logic.

Business Logic: Managing Life Cycle State

Overview

The "state" of a business object 207 is the set of all its attributes. Life cycle state refers only to a single attribute (or a small group of attributes) that determine where the BO 207 is in its life cycle. For example, the life cycle states of a Task are Open, Completed, Cleared, or Error. Business objectives usually involve moving a BO toward its final state (i.e., Completed for a Task, Closed for a Supplement, etc.).

Often, there are restrictions on a BO's movement through its life cycle. For example, a Task may only move to the Error state after first being Completed or Cleared. BOs provide a mechanism to ensure that they do not violate life cycle restrictions when they move from state to state.

Approach

A BO 207 has a method to move to each one of its different life cycle states. Rather than simply exposing a public variable containing the life cycle state of the task, the BO exposes methods, such as Task.Clear( ), Task.Complete( ), and Task.MarkInError( ), that move the task a new state. This approach prevents the task from containing an invalid value for life cycle state, and makes it obvious what the life cycle states of a task are.

Example

```
' CTask Business Object
Public Sub MarkInError( )
    On Error Goto ErrorHandler
    Select Case m__nLifeCycleState
        ' move to error only if I've already been completed or cleared
        Case cmTaskCompleted, cmTaskCleared
            m__nLifeCycleState = cmTaskInError
        ' otherwise, raise an error
        Case Else
            Err.Raise cmErrInvalidLifeCycleState
    End Select
    Exit Sub
ErrorHandler:
    Err.Raise Err.Number
End Sub
```

Business Logic: Operating on Groups of Business Objects

Overview

Sometimes, a BO 207 acts as a container for a group of other BOs. This happens when performing operations involving multiple BOs. For example, to close, a claim ensures that it has no open supplements or tasks. There might be a method on the claim BO—CanClose( )—that evaluates the business rules restricting the closing of a claim and return true or false. Another situation might involve retrieving the open tasks for a claim. The claim can loop through its collection of tasks, asking each task if it is open and, if so, adding it to a temporary collection which is returned to the caller.

Example

```
' Claim Business Object
' Error handling omitted for clarity
Public Function CanClose( ) As Boolean
    CanClose = HasOpenTasks( ) And HasOpenSupplements( )
End Function
```

-continued

```
Public Function HasOpenTasks( ) As Boolean
    ' assume that I have open tasks
    HasOpenTasks = True
    ' loop through all my tasks and exit if I find one that is open
    Dim task As CTask
    For Each task In m__colTasks
        If task.IsOpen( ) Then Exit Function
    Next task
    ' I must not have any open tasks
    HasOpenTasks = False
End Function
Public Function HasOpenSupplements( ) As Boolean
    ' assume that I have open supplements
    HasOpenSupplements = True
    ' loop through all my supplements and exit if I find one that is open
    Dim supp As CSupplement
    For Each supp In m__colSupplements
        If supp.IsOpen( ) Then Exit Function
    Next supp
    HasOpenSupplements = False
End Function
Public Function GetOpenTasks( ) As Collection
    Dim task As CTask
    Dim colOpenTasks As Collection
    For Each task In m__colTasks
        If task.IsOpen( ) Then colOpenTasks.Add task, task.Id
    Next task
    Set GetOpenTasks = colOpenTasks
End Function
```

Business Object Structures

Overview

When a BO 207 is added or updated, it sends all of its attributes down to a server component 222 to write to the database. Instead of explicitly referring to each attribute in the parameter list of the functions on the CCA 208 and server component 222, all the attributes are sent in a single variant array. This array is also known as a structure.

Approach

Each editable BO 207 has a method named AsStruct that takes the object's member variables and puts them in a variant array. The CCA 208 calls this method on a BO 207 before it sends the BO 207 down to the server component 222 to be added or updated. The reason that this is necessary is that, although object references can be passed by value over the network, the objects themselves cannot. Only basic data types like Integer and String can be sent by value to a server component 222. A VB enumeration is used to name the slots of the structure, so that the server component 222 can use a symbolic name to access elements in the array instead of an index. Note that this is generally used only when performing adds or full updates on a business object 207.

In a few cases, there is a reason to re-instantiate the BO 207 on the server side. The FromStruct method does exactly the opposite of the AsStruct method and initializes the BO 207 from a variant array. The size of the structure passed as a parameter to FromStruct is checked to increase the certainty that it is a valid structure.

When a BO 207 contains a reference to another BO 207, the AsStruct method stores the primary key of the referenced BO 207. For example, the Task structure contains a PerformerId, not the performer BO 207 that is referenced by the task. When the FromStruct method encounters the PerformerId in the task structure, it instantiates a new performer BO and fills in the ID, leaving the rest of the performer BO empty.

Example

```
' CTask Business Object
' enumeration of all task attributes
Public Enum TaskAttributes
    cmTaskId
    cmTaskName
    :
    cmTaskDescription
End Enum
' all task attributes declarations here
' all setter and getter functions here
Public Function AsStruct( ) As CTask
    On Error Goto ErrorHandler
    ' create and fill structure
    Dim vStruct(cmTaskNumOfAttributes − 1) As Variant
    vStruct(cmTaskId) = m_vId
    vStruct(cmTaskName) = m_sName
    vStruct(cmTaskPerformerId) = m_vPerformerId
    :
    vStruct(cmTaskDescription) = m_sDescription
    AsStruct = vStruct
    Exit Function
ErrorHandler:
    Err.Raise Err.Number
End Function
Public Sub FromStruct(vStruct As Variant)
    On Error Goto ErrorHandler
    ' check size of vStruct
    If Ubound(vStruct) <> (cmTaskNumOfAttributes − 1) Then
    Err. Raise cmErrInvalidParameters
    ' update my values from the structure
    m_vId = vStruct(cmTaskId)
    m_sName = vStruct(cmTaskName)
    m_vPerformer.Id = vStruct(cmTaskPerformerId)
    m_sDescription = vStruct(cmTaskDescription)
    Exit Sub
ErrorHandler:
    Err.Raise Err.Number
End Sub
```

Cloning Business Objects

Overview

Often a copy of a business object 207 is made. Cloning is a way to implement this kind of functionality by encapsulating the copying process in the BO 207 itself. Controllers 206 that need to make tentative changes to a business object 207 simply ask the original BO 207 for a clone and make changes to the clone. If the user decides to save the changes, the controller 206 ask the original BO to update itself from the changes made to the clone.

Approach

Each BO 207 has a Clone method to return a shallow copy of itself. A shallow copy is a copy that doesn't include copies of the other objects that the BO 207 refers to, but only a copy of a reference to those objects. For example, to clone a task, it does not give the clone a brand new claim object; it gives the clone a new reference to the existing claim object. Collections are the only exception to this rule—they are always copied completely since they contain references to other BOs.

Each BO 207 also has an UpdateFromClone method to allow it "merge" a clone back in to itself by changing its attributes to match the changes made to the clone.

Example

```
' CTask Business Object
Public Function Clone( ) As CTask
    On Error Goto ErrorHandler
    ' create clone object
    Dim tskClone As CTask
    Set tskClone = New CTask
    ' fill clone with my data
    With tskClone
        .Id = m_vId
        .Name = m_sName
        .PerformerId = m_vPerformerId
        Set .Performer = m_prfPerformer
        :
        .Description = m_sDescription
    End With
    Set Clone = tskClone
    Exit Function
ErrorHandler:
    Err.Raise Err.Number
End Function
Public Sub UpdateFromClone(tskClone As CTask)
    On Error Goto ErrorHandler
    ' set my values egual to the clone's values
    With tskClone
        m_vId = .ID
        m_sName = .Name
        m_vPerformerId = .PerformerId
        Set m_prfPerformer = .Performer
        :
        m_sDescription = .Description
    End With
    Exit Sub
ErrorHandler:
    Err. Raise Err Number
End Sub
```

Half-Baked Business Objects

Overview

BOs 207 occasionally are filled only half-full for performance reasons. This is done for queries involving multiple tables that return large data sets. Using half-baked BOs 207 can be an error prone process, so it is essential that the half-baking of BOs are carefully managed and contained.

In most applications, there are two kinds of windows—search windows and edit/detail windows. Search windows are the only windows that half-bake BOs 207. Generally, half-baking only is a problem when a detail window expecting a fully-baked BO receives a half-baked BO from a search window.

Approach

Detail windows refresh the BOs 207 they are passed by the search windows, regardless of whether or not they were already fully-baked. This addresses the problems associated with passing half-baked BOs and also helps ensure that the BO 207 is up-to-date.

This approach requires another type of method (besides Get, Add, Update, and Delete) on the CCA 208: a Refresh method. This method is very similar to a Get method (in fact, it calls the same method on the server component) but is unique because it refreshes the data in objects that are already created. The detail window's controller 206 calls the appropriate CCA 208 passing the BO 207 to be refreshed, and may assume that, when control returns from the CCA 208, the BO 207 will be up-to-date and fully-baked.

This is may not be necessary if two windows are very closely related. If the first window is the only window that ever opens the second, it is necessary for the second window to refresh the BO 207 passed by the first window if it knows that the BO 207 is baked fully enough to be used.

CCAs

CCAs 208 are responsible for transforming data from row and columns in a recordset to business objects 207, and for executing calls to server components 222 on behalf of controllers 206.

Retrieving Business Objects

Overview

After asking a component to retrieve data, the CCA 208 marshals the data returned by the component into business objects 207 that are used by the UI Controller 206.

Approach

The marshaling process is as follows:

CCAs 208 call GetRows on the recordset to get a copy of its data in a variant array in order to release the recordset as soon as possible. A method exist to coordinate the marshaling of each recordset returned by the component.

Only one recordset is coordinated in the marshaling process of a single method. A method exist to build a BO from a single row of a recordset. This method is called once for each row in the recordset by the marshaling coordination method.

Example

```
' Task CCA
Public Function GetAllTasks( ) As Collection
    On Error Goto ErrorHandler
    ' call a helper method to retrieve tasks
    Dim vRows As Variant
    vRows = RetrieveAllTasks
    Dim i As Integer
    Dim task As CTask
    Dim colTasks As Collection
    Set colTasks = New Collection
    ' vRows is dimmed as column, row. Loop til I run out of
rows.
    For i = 0 To Ubound(vRows, 2)
        ' build BO using helper method
        Set task = BulidTaskFromRow(vRows, i)
        ' add to collection with ID as the key
        colTasks.Add task, task.Id
    Next i
    Set MarshalTasks = colTasks
    Exit Function
ErrorHandler:
    Err.Raise Err.Number
End Function
Private Function RetrieveAllTasks( ) As Variant
    On Error Goto ErrorHandler
    ' call my component and get a recordset full of all tasks
    Dim rs As ADOR.Recordset
    Set rs = tskComp.GetAllTasks( )
    ' get data in variant array from the recordset
    GetAllTasks = rs.GetRows
    ' release the recordset ASAP
    rs.Close
    Set rs = Nothing
    Exit Function
ErrorHandler:
    Err. Raise Err.Number
End Function
Private Function BuildTaskFromRow(vRows As Variant,
nCurrentRow As Integer, _
                    Optional task As CTask) As
CTask
    On Error Goto ErrorHandler
    ' create task if it wasn't passed
    If task Is Nothing Then Set task = New CTask
    ' fill task with data
    With task
        .Id = vRows(0, nCurrentRow)
        .Name = vRows(1, nCurrentRow)
        .PerformerId = vRows(2, nCurrentRow)
        :
        .Description = vRows(32, nCurrentRow)
    End With
    Set BuildTaskFromRow = task
    Exit Function
ErrorHandler:
    Err.Raise Err.Number
End Function
```

Refreshing Business Objects

Overview

The logic to refresh BOs 207 is very similar to the logic to create them in the first place. A "refresh" method is very similar to a "get" method, but must use BOs 207 that already exist when carrying out the marshalling process.

Example

```
' Task CCA
Public Sub RefreshTask(task As CTask)
    On Error Goto ErrorHandler
    ' call a helper method to retrieve tasks
    Dim vRow As Variant
    vRow = RetrieveTaskWithId(task. Id)
    BuildTaskFromRow vRow, i, task
    Exit Sub
ErrorHandler:
    Err.Raise Err.Number
End Sub
Private Function RetrieveTaskWithId(vId As Variant) As Variant
    On Error Goto ErrorHandler
    ' call my component and get a recordset full of all tasks
    Dim rs As ADOR.Recordset
    Set rs = tskComp.GetTaskWithId(vId)
    ' get data in variant array from the recordset
    RetrieveTaskWithId = rs.GetRows
    ' release the recordset ASAP
    rs.Close
    Set rs = Nothing
    Exit Function
ErrorHandler:
    Err.Raise Err.Number
End Function
```

Adding Business Objects

Overview

Controllers 206 are responsible for creating and populating new BOs 207. To add a BO 207 to the database, the controller 206 must call the CCA 208, passing the business object 207 to be added. The CCA 208 calls the AsStruct method on the BO 207, and pass the BO structure down to the component to be saved. It then updates the BO 207 with the ID and timestamp generated by the server. Note the method on the CCA 208 just updates the BO 207.

Example

```
' Task CCA
Public Sub AddTask(task As CTask)
    On Error Goto ErrorHandler
    ' call component to add task passing a task structure
    Dim vIdAndTimestamp As Variant
    vIdAndTimestamp = tskComp.AddTask(task.AsStruct ( ))
    ' update ID and Timestamp on task
    task.Id = vIdAndTimestamp(0)
    task.TimeStamp = vIdAndTimestamp(1)
    Exit Sub
ErrorHandler:
    Err.Raise Err.Number
End Sub
```

Updating Business Objects

Overview

The update process is very similar to the add process. The only difference is that the server component only returns a timestamp, since the BO already has an ID.

Example

```
' Task CCA
Public Sub UpdateTask(task As CTask)
    On Error Goto ErrorHandler
    ' call component to update task passing a task structure
    Dim lTimeStamp As Long
    lTimeStamp = tskcomp.AddTask (task.AsStruct ( ))
    ' update Timestamp on task
    task.TimeStamp = lTimeStamp
    Exit Sub
ErrorHandler:
    Err.Raise Err.Number
End Sub
```

Deleting Business Objects

Deleting Overview

Like the add and the update methods, delete methods take a business object 207 as a parameter and do not have a return value. The delete method does not modify the object 207 it is deleting since that object will soon be discarded.

Example

```
' Task CCA
Public Sub DeleteTask(task As CTask)
    On Error Goto ErrorHandler
    ' call component to update task passing a the ID and
Timestamp
    tskComp DeleteTask task.Id, task TimeStamp
    Exit Sub
ErrorHandler:
    Err.Raise Err.Number
End Sub
```

Server Component

Server components 222 have two purposes: enforcing business rules and carrying out data access operations. They are designed to avoid duplicating logic between functions.

Designing for Reuse

Enforcing Encapsulation

Each server component 222 encapsulates a single database table or a set of closely related database tables. As much as possible, server components 222 select or modify data from a single table. A component occasionally selects from a table that is "owned" or encapsulated by another component in order to use a join (for efficiency reasons). A server component 222 often collaborates with other server components to complete a business transaction.

Partioning Logic Between Multiple Classes

If the component becomes very large, it is split into more than one class. When this occurs, it is divided into two classes—one for business rules and one for data access. The business rules class implements the component's interface and utilizes the data access class to modify data as needed.

Example

```
Private Function MarkTaskInError( vMsg As Variant, _
                                  vTaskId As Variant, _
                                  lTimestamp As Variant, _
                                  sReason As String) As Long
    On Error GoTo ErrorHandler
    Const cmMethodName = "MarkTaskInError"
    ' set the SQL statement
    Dim sSQL As String
    sSQL = cmSQLMarkTaskInError
    ' get a new timestamp
    Dim lNewTimeStamp As Long
    lNewTimeStamp = GetTimeStamp( )
    ' create and fill a collection of arguments to be merged
with
    the SQL by the ExecuteQuery method
    Dim colArgs As CCollection
    Set colArgs = New CCollection
    With colArgs
        .Add lNeWTimestamp
        .Add cmDBBooleanTrue
        .Add sReason
        .Add vTaskId
        .Add lTimestamp
    End With
    ' run the SQL and set my return value
    ExecuteQuery vMsg, cmUpdate, sSQL, colArguments:=colArgs
    MarkTaskInError = lNewTimeStamp
    ' tell MTS I'm done
    GetObjectContext.Setcomplete
    Exit Function
ErrorHandler:
    ' do error handling here
End Function
```

Error Handling

General Information

With the exception of "Class_Initialize", "Class Terminate", and methods called within an error handler, every function or subroutine has a user defined 'On Error GoTo' statement. The first line in each procedure is: On Error GoTo ErrorHandler. A line near the end of the procedure is given a label "ErrorHandler". (Note that because line labels in VB 5.0 have procedure scope, each procedure can have a line labeled "ErrorHandler"). The ErrorHandler label is preceded by a Exit Sub or Exit Function statement to avoid executing the error handling code when there is no error.

Errors are handled differently based on the module's level within the application (i.e., user interface modules are responsible for displaying error messages to the user).

All modules take advantage of technical architecture to log messages. Client modules that already have a reference to the architecture call the Log Manager object directly. Because server modules do not usually have a reference to the architecture, they use the LogMessage( ) global function complied into each server component.

Any errors that are raised within a server component 222 are handled by the calling UI controller 206. This ensures that the user is appropriately notified of the error and that business errors are not translated to unhandled fatal errors.

All unexpected errors are handled by a general error handler function at the global Architecture module in order to always gracefully shut-down the application.

Server Component Errors

The error handler for each service module contains a Case statement to check for all anticipated errors. If the error is not a recoverable error, the logic to handle it is first tell MTS about the error by calling GetObjectContext.SetAbort( ). Next, the global LogMessage( ) function is called to log the short description intended for level one support personnel. Then the LogMessage( ) function is called a second time to log the detailed description of the error for upper level support personnel. Finally, the error is re-raised, so that the calling function will know the operation failed.

A default Case condition is coded to handle any unexpected errors. This logs the VB generated error then raises it. A code sample is provided below:

Following is an example of how error handling in the task component is implemented when an attempt is made to reassign a task to a performer that doesn't exist. Executing SQL to reassign a task to a non-existent performer generates a referential integrity violation error, which is trapped in this error handler:

```
'Class Declarations
Private Const cmClassName = "CTaskComp"
Public Sub ReassignTask( . . . )
    On Error GoTo ErrorHandler
    Private Const cmMethodName = "ReassignTask"
    Private Const cmErrReassignTask = "Could not reassign
task."
    :
    ' logic to reassign a task
    :
    GetObjectContext.SetComplete
    Exit Sub
ErrorHandler:
    Dim sShortDescr As String
    sShortDescr = cmErrReassignTask
    ' log short description as warning
    LogMessage vMsg, Err.Number, cmSeverityWarning,
cmClassName, cmMethodName, sShortDescr
    Dim sLongDescr As String
    Select Case Err.Number
      Case cmErrRefIntegrityViolation
         GetObjectContext.SetAbort
         sLongDescr = "Referential integrity violation -
tried" _
              & "to reassign task to a non-existant
performer. " _
              & "Association ID: " & sAssnId _
              & "Association Type: " & sAssnType _
              & "old Performer Id: " & sOldPerformerId _
              & "New Performer Id: " & sNewPerformerId
         ' log long description as severe
         LogMessage vMsg, Err.Number, cmSeveritySevere,
cmClassName, cmMethodName, _
              sLongDescr
         Err.Raise Err.Number
         :
         ' more error handling
      Case Else
         let architecture handle unanticipated error
         Dim nResumeCode As Integer
         nResumeCode = GeneralErrorHandler(vMsg, cmServer,
cmClassName, cmMethodName)
         Select Case nResumeCode
            Case cmErrorResume
               Resume
            case cmErrorResumeNext
               Resume Next
            Case cmErrorExit
               Exit Sub
            Case Else
               GetObjectContext.Abort
               Err.Raise Err.Number
         End Select
    End Select
End Sub
```

CCAs, CCIs, Business Objects, and Forms

All CCI's, CCA's, Business Objects, and Forms raise any error that is generated. A code sample is provided below:

```
Sub SubName( )
    On Error GoTo ErrorHandler
    <the procedure's code here>
    . . .
    Exit Sub
ErrorHandler:
    Err.Raise Err.Number
End Sub
```

User Interface Controller Errors

The user interface controllers 206 handle any errors generated and passed up from the lower levels of the application. UI modules are responsible for handling whatever errors might be raised by server components 222 by displaying a message box to the user.

Any error generated in the UI's is also displayed to the user in a dialog box. Any error initiated on the client is logged using the LogMessage( ) procedure. Errors initiated on the server will already have been logged and therefore do not need to be logged again.

All unexpected errors are trapped by a general error method at the global architecture module. Depending on the value returned from this function, the controller may resume on the statement that triggered the error, resume on the next statement, call its Quiesce function to shut itself down, or call a Shutdown method on the application object to shutdown the entire application.

No errors are raised from this level of the application, since controllers handle all errors. A code sample of a controller error handler is provided below:

```
' Class Constants
Private Const cmClassName As String = "<ComponentName>"
Sub SubName( )
    On Error GoTo ErrorHandler
    Const cMethodName As String = "<MethodName>"
    :
    :
    <the procedure's code here>
    :
    :
    Exit Sub
ErrorHandler:
    Select Case CStr(Err.Number)
         Case . . .
            ' display the error to the user
            ' perform any necessary logic
            Exit Sub (or Resume, or Resume Next)
         :
         :
         Case Else
            Dim nResumeCode As Integer
            nResumeCode = GeneralErrorHandler (vMsg,
cmController, cmClassName, cMethodName)
            Select Case CStr(nResumeCode)
               Case cmErrorResume
                  Resume
               Case cmErrorResumeNext
                  Resume Next
               Case cmErrorExit
                  Exit Sub
```

-continued

```
        Case cmErrorQuiesce
            Quiesce
        Case Else
            objApp.SHUTDOWN
        End Select
    End Select
End Sub
```

Localization

The CBAM application is constructed so that it can be localized for different languages and countries with a minimum effort or conversion.

Requirements and Scope

The CBAM architecture provides support for certain localization features:

Localizable Resource Repository;

Flexible User Interface Design;

Date Format Localization; and

Exposure of Windows Operation System Localization Features.

| Localization Approach Checklist | | | |
|---|---|---|---|
| Localization Feature | Supported via Architecture Service | Supported via Architecture API's | Best Practices and Assumptions* |
| Language Code (Locale Identifier) | ✓ | | |
| Time Zones | | | ✓ |
| Date/Time | | ✓ | |
| Name | | | ✓ |
| Telephone Numbers | | | ✓ |
| Functions to Avoid | | | ✓ |
| Weights and Measures | | | ✓ |
| Money | | | ✓ |
| Addresses/Address Hierarchies | | | ✓ |
| Menus, Icons, Labels/Identifiers on Windows | | | ✓ |
| Messages/Dialogs | ✓ | | |
| String Functions, Sort Order and String Comparison | ✓ | | |
| Code Tables | ✓ | | |
| Drop-Down Lists | ✓ | | |
| Form & Correspondence Templates | | | ✓ |
| Online and Printed Documentation | | | ✓ |
| Database (DB2) | | | ✓ |
| 3rd Party Controls | | | ✓ |
| Miscellaneous | | | ✓ |

Localizable Literals Repository

The CBAM application has an infrastructure to support multiple languages. The architecture acts as a centralized literals repository via its Codes Table Approach.

The Codes Tables have localization in mind. Each row in the codes table contains an associated language identifier. Via the language identifier, any given code can support values of any language.

Flexible Interface 400

Figure 4:
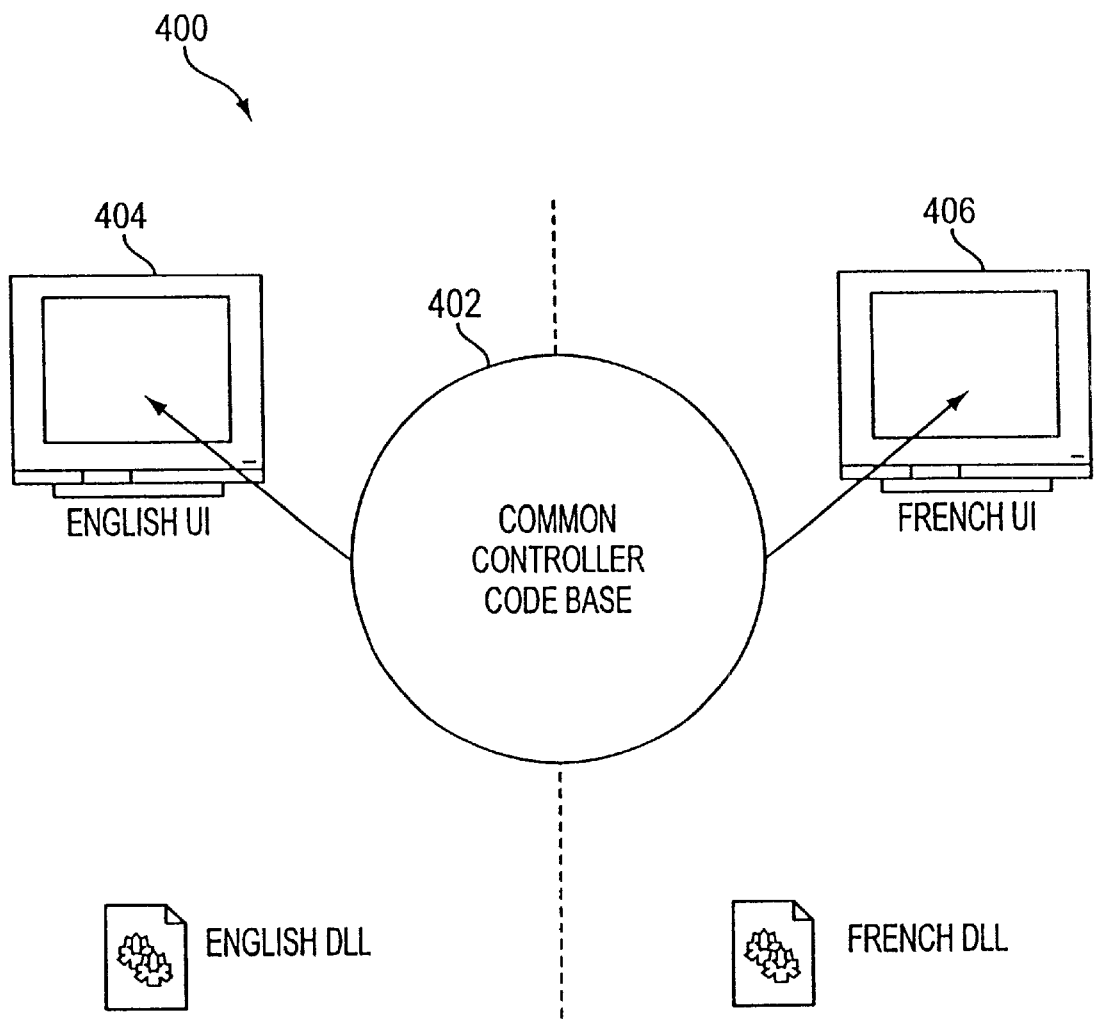
FIG. 4 is an illustration showing how different languages are repainted and recompiled.

Flexible user interface 400 and code makes customization easy. The FIG. 4 illustrates how different languages are repainted and recompiled. For example, both a English UI 404, and a French UI 406 are easily accommodated. This entails minimal effort because both UIs share the same core code base 402. Updates to the UIs are merely be a superficial change.

Generic graphics are used and overcrowding is avoided to create a user interface which is easy to localize.

Data Localization

Language localization settings affect the way dates are displayed on UIs (user interfaces). The default system display format is different for different Language/Countries. For Example:

English (United States) displays "mm/dd/yy" (e.g,., "May 16, 1998")

English (United Kingdom) displays "dd/mm/yy" (e.g,., "May 16, 1998").

The present inventions UI's employ a number of third-party date controls including Sheridan Calendar Widgets (from Sheridan Software) which allow developers to set predefined input masks for dates (via the controls' Property Pages; the property in this case is "Mask").

Although the Mask property can be manipulated, the default setting is preferably accepted (the default setting for Mask is "0–System Default"; it is set at design time). Accepting the default system settings eliminates the need to code for multiple locales (with some possible exceptions), does not interfere with intrinsic Visual Basic functions such as DateAdd, and allows dates to be formatted as strings for use in SQL.

The test program illustrated below shows how a date using the English (United Kingdom) default system date format is reformatted to a user-defined format (in this case, a string constant for use with DB2 SQL statements):

```
Const cmDB2DateAndTime = "mm-dd-yyyy-h.mm.ss"
Private Sub cmdConvToDB2_Click()
    Dim sDB2Date As String
    sDB2Date = Format$(SSDateCombo1.Date,
    cmDB2DateAndTime)
    txtDB2String.Text = sDB2Date
end sub
```

Leverage Windows Operation System

The CBAM architecture exposes interface methods on the RegistryService object to access locale specific values which are set from the control panel.

The architecture exposes an API from the RegistryService object which allows access to all of the information available in the control panel. Shown below is the signature of the API:

GetRegionalInfo(Info As RegionalInfo) As String
Where RegionalInfo can be any of the values in the table below:

| RegionalInfo Values | | | |
|---|---|---|---|
| CmLanguageId | CmDTDateSeparator | cmDayLongNameMonday | cmMonthLongNameJan |
| CmLanguageLocalized | CmDTTimeSeparator | cmDayLongNameTuesday | cmMonthLongNameFeb |
| CmLanguageEnglish | CmDTShortDateFormat | cmDayLongNameWednesday | cmMonthLongNameMar |
| CmLanguageAbbr | CmLDTongDateFormat | cmDayLongNameThursday | cmMonthLongNameApr |
| CmLanguageNative | CmDTTimeFormat | cmDayLongNameFriday | cmMonthLongNameMay |
| CmCountryId | CmDTDateFormatOrdering | cmDayLongNameSaturday | cmMonthLongNameJun |
| CmCountryLocalized | CmDTLongDateOrdering | cmDayLongNameSunday | cmMonthLongNameJul |
| CmCountryEnglish | CmDTTimeFormatSpecifier | cmDayAbbrNameMonday | cmMonthLongNameAug |
| CmCountryAbbr | CmDTCenturyFormatSpecifier | cmDayAbbrNameTuesday | cmMonthLongNameSep |
| CmCountryNative | CmDTTimeWithLeadingZeros | cmDayAbbrNameWednesday | cmMonthLongNameOct |
| CmLanguageDefaultId | CmDTDayWithLeadingZeros | cmDayAbbrNameThursday | cmMonthLongNameNov |
| CmCountryDefaultId | CmDTMonthWithLeadingZeros | cmDayAbbrNameFriday | cmMonthLongNameDec |
| | CmDTDesignatorAM | cmDayAbbrNameSaturday | cmMonthAbbrNameJan |
| | CmDTDesignatorPM | cmDayAbbrNameSunday | cmMonthAbbrNameFeb |
| | | | cmMonthAbbrNameMar |
| | | | cmMonthAbbrNameApr |
| | | | cmMonthAbbrNameMay |
| | | | cmMonthAbbrNameJun |
| | | | cmMonthAbbrNameJul |
| | | | cmMonthAbbrNameAug |
| | | | cmMonthAbbrNameSep |
| | | | cmMonthAbbrNameOct |
| | | | cmMonthAbbrNameNov |
| | | | cmMonthAbbrNameDec |

Get RegionalInfo Example

```
Private Sub Commnd1_Click( )
    MsgBox "This is the language id for English: " & _
    GetRegionalInfo (cmLanguageId)
End Sub
```

Logical Unit of Work

The Logical Unit of Work (LUW) pattern enables separation of concern between UI Controllers 206 and business logic.

Overview

Normally, when a user opens a window, makes changes, and clicks OK or Save, a server component 222 is called to execute a transaction that will save the user's changes to the database. Because of this, it can be said that the window defines the boundary of the transaction, since the transaction is committed when the window closes.

The LUW pattern is useful when database transactions span windows. For example, a user begins editing data on one window and then, without saving, opens another window and begins editing data on that window, the save process involves multiple windows. Neither window controller 206 can manage the saving process, since data from both windows must be saved as an part of an indivisible unit of work. Instead, a LUW object is introduced to manage the saving process.

The LUW acts as a sort of "shopping bag". When a controller 206 modifies a business object 207, it puts it in the bag to be paid for (saved) later. It might give the bag to another controller 206 to finish the shopping (modify more objects), and then to a third controller who pays (asks the LUW to initiate the save).

Approach

Controllers 206 may have different levels of LUW "awareness":

Requires New: always creates a new LUW;

Requires: requires an LUW, and creates a new LUW only if one is not passed by the calling controller;

Requires Existing: requires an LUW, but does not create a new LUW if one is not passed by the calling controller. Raises an error if no LUW is passed; and Not Supported: is not capable of using an LUW.

Controllers 206 that always require a new LUW create that LUW in their ArchInitClass function during initialization. They may choose whether or not to involve other windows in their LUW. If it is desirable for another window to be involved in an existing LUW, the controller 206 that owns the LUW passes a reference to that LUW when it calls the App Object 202 to open the second window. Controllers 206 that require an LUW or require an existing LUW accept the LUW as a parameter in the ArchInitClass function.

LUWs contain all the necessary logic to persist their "contents"—the modified BOs 207. They handle calling methods on the CCA 208 and updating the BOs 207 with new IDs and/or timestamps.

Architecture API Hierarchy

Following is an overview of the architecture object model, including a description of each method and the parameters it accepts. Additional sections address the concepts behind specific areas (code caching, message logging, and data access) in more detail.

Arch Object

Figure 5:
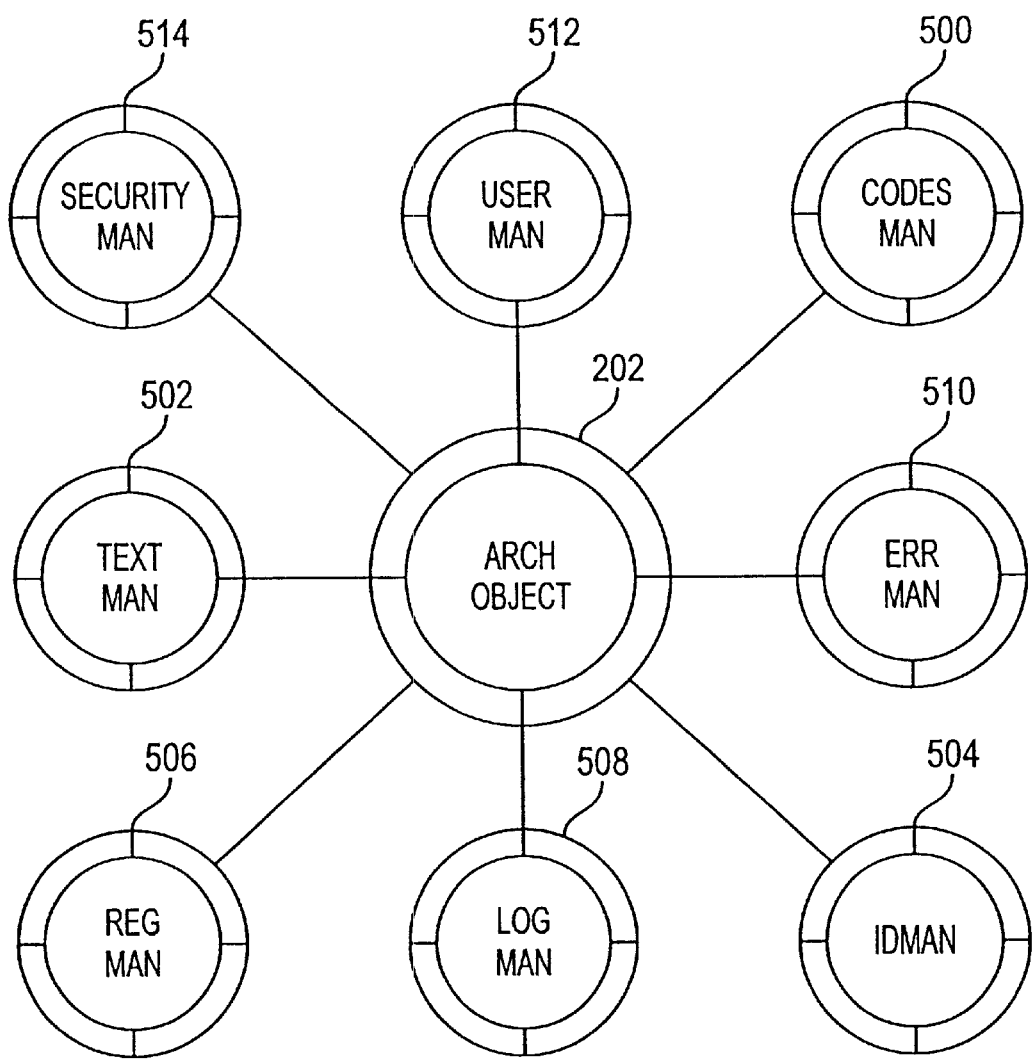
FIG. 5 is a block diagram of an Architecture Object.

FIG. 5 depicts the current properties on the Arch Object 200.

The following are APIs located on the Arch Object 200 which return either a retrieved or created instance of an object which implements the following interfaces:

CodesMan( ) 500;
TextMan( ) 502;
IdMan( ) 504;
RegMan( ) 506;
LogMan( ) 508;
ErrMan( ) 510;
UserMan( ) 512; and
SecurityMan( ) 514.

AsMsgStruct( )

This method on the Arch Object returns a variant structure to pass along a remote message.

```
Syntax:
    Public Function AsMsgStruct( ) As Variant
    End Function
Example:
    Dim vMsg As Variant
    vMsg = objArch.AsMsgStruct
```

CodesMan

The following are APIs located on the interface of the Arch Object 200 named CodesMan 500:

CheckCacheFreshness( );
FillControl(ctlControl, nCategory, nFillType, [nCodeStatus], [colAssignedCodes]);
FilterCodes(colAllCodes, nCodeStatus);
GetCategoryCodes(nCategory);
GetCodeObject(nCategory, sCode);
GetResourceString(lStringId);
GetServerDate( );
RefreshCache( );
RemoveValidDates(sCode, colPassedInAssignedCodes); and
SetServerDate(dtServerDate).

CheckCacheFreshness( )

Checks whether the cache has expired, if so refresh.

```
Syntax:
    Private Sub CheckCacheFreshness( )
    End Sub
Example:
    CheckCacheFreshness
```

FillControl( )

This API is used to fill listboxes or comboboxes with values from a list of CodeDecodes. Returns a collection for subsequent lookups to Code objects used to fill controls.

```
Syntax:

Public Function FillControl(ctlControl As Object, nCategory As
CodeDecodeCats, nFillType As CodeDecodeLengths, Optional
nCodeStatus As CodeDecodeFilters = cmValidCodes, Optional
colAssignedCodes As CCollection) As CCollection End Function
```

-continued

```
Parameters:

ctlControl: A reference to a passed in listbox or combobox.
nCategory: The integer based constant which classified these
CodeDecodes from others. Several of the valid constants include:
    cmCatTaskType = 1
    cmCatSource
    cmCatTaskStatus
nFillType: The attribute of the CodeDecode which you want to fill.
Several of the valid values include:
    cmCode
    cmShortDecode
    cmLongDecode
nCodeStatus: Optional value which filters the Code Decodes according to
their Effective and Expiration dates. Several of the valid constants include:
    cmAllCodes        Pending + Valid + Expired Codes
    cmPendingCodes    Codes whose effective date is greater than the
                      current date
    cmValidCodes      Not Pending or Expired Codes
colAssignedCodes: Used when filling a control which should fill and
include assigned values.
Example:

'Declare an instance variable for States collection on object
Private colStates As CCollection
'Call FillControll API, and set local collection inst var to collection of
codes which were used to fill the controll. This collection will be used for
subsequent lookups.
Set colStates =
objArch.CodesMan.FillControl(frmCurrentForm.cboStates,
cmCatStates, cmLongDecode)
```

FilterCodes( )

Returns a collection of code/decodes that are filtered using their effective and expiration dates based on which nCodeStatus is passed from the fillcontrol method.

```
Syntax:

Private Function FilterCodes(colAllCodes As CCollection, nCodeStatus
As CodeDecodeFilters) As CCollection
End Function
Parameters:

colAllCodes:
nCodeStatus:
Example:

Set colFilteredCodes = FilterCodes(colCodes, nCodeStatus)
```

GetCategoryCodes( )

Returns a collection of CCode objects given a valid category

```
Syntax:

Public Function GetCategoryCodes(nCategory As CodeDecodeCats) As
CCollection End Function
Parameters:

nCategory: The integer based constant which classified these
CodeDecodes from others.
Example:

Dim colMyStates As CCollection
Set colMyStates = objArch.CodesMan.GetCategoryCodes(cmCatStates)
'Below shows an example of looking up the Code value for the currently
selected state.
```

-continued

```
With frmCurrentForm.cboStates
    If .ListIndex > -1 Then
    Dim objCode As CCode
        Set objCode = colStates(.ItemData(.ListIndex))
        sStateCode = objCode.Code
    End If
End With
```

GetCodeObject( )
   Returns a valid CCode object given a specific category and code.

Syntax:

Public Function GetCodeObject(nCategory As CodeDecodeCats, sCode As String) As CCode
End Function
Parameters:

nCategory: The integer based constant which classified these CodeDecodes from others.
sCode: A string indicating the Code attribute of the CodeDecode object.
Example:

frmCurrentForm.lblState = objArch.CodesMan.GetCodeObject(cmCatStates, "IL").LongDecode GetResourceString( )
   Returns a string from the resource file given a specific string ID.

Syntax:

Private Function GetResourceString(1StringId As Long) As String
End Function
Parameters:

1StringId: The id associated with the string in the resource file.
Example:

sMsg = arch.CodesMan.GetResourceString(CLng(vMessage))

GetServerDate( )
   Returns the date from the server.

Syntax:

Private Function GetServerDate( ) As Date
End Function
Example:

SetServerDate CCA.GetServerDate

RefreshCache( )
   Refreshes all of the code obhjects in the cache.

Syntax:

Private Sub RefreshCache( )
End Sub
Example:

m_Cache.RefreshCache

Remove ValidCodes( )
   Removes all valid codes from the passed in assigned codes collection, which is used to see which codes are assigned and not valid.

Syntax:

Private Sub RemoveValidCodes(sCode As String, colPassedInAssignedCodes As CCollection)
End Sub
Parameters:

sCode: Name of code
colPassedInAssignedCodes: Codes already in use.
Example:

RemoveValidCodes codCode.Code, colPassedInAssignedCodes

SetServerDate( )
   Sets the server date.

Syntax:

Private Sub SetServerDate(dtServerDate As Date)
End Sub
Parameters:

dtServerDate: Date of Server.
Example:

SetServerDate CCA.GetServerDate

TextMan

The following are APIs located on the interface of the Arch Object 200 named TextMan 502.
   PairUpAposts( );
   PairUpAmps( ); and
   MergeParms ( ).
PairUpAposts( )
   Pairs up apostrophes in the passed string.

Syntax:

Public Function PairUpAposts(sOriginalString As String) As String
End Function
Parameters:

sOriginalString: string passed in by the caller
Example:

Dim sString As String
sString = objArch.TextMan.PairUpAposts("This is Monika's string")
'expected return: sString = "This is Monika's string"

PairUpAmps( )
   Pairs up ampersands in the passed string.

Syntax:

Public Function PairUpAmps(sOriginalString As String) As String
End Function
Parameters:

sOriginalString: string passed in by the caller

-continued

Example:

```
Dim sString As String
sString = objArch.TextMan.PairUpAmps("Forms&Corr")
'expected return: sString = "Forms&&Corr"
```

MergeParms( )

Merges string with the passed parameters collection.

Syntax:

Public Function MergeParms(sString As String, colParms As CCollection) As String
End Function
Parameters:

sOriginalString: string passed in by the caller
colParms As Ccollection: collection of the parameters passed in by the caller
Example:

Dim sString As String
sString = objArch.TextMan.MergeParms(sString, colParms)

IdMan

The following are APIs located on the interface of the Arch Object 200 named IdMan 504:

GetGUID( );
GetSequenceID( );
GetTimeStamp( );
GetTrackingNbr( ); and
GetUniqueId( ).

GetGUID ( )

Syntax:

Public Function GetGUID( )
End Function
Example:

Dim vNewGuid As Variant
vNewGuid = objArch.IdMan.GetGUID

GetSequenceId ( )

Syntax:

Public Function GetSequenceId(sTemplateType As CounterName) As String End Function
Parameters:

sTemplateType: The string specifying the template requesting a sequence id (i.e. cmCountFC = Forms & Corr)
Example:

frmCurrentForm.txtTemplateNumber = objArch.IdMan.GetSequenceId(cmCountFC)

GetTimeStamp ( )

Syntax:

Public Function GetTimeStamp( )
End Function
Example:

Dim nNewTimeStamp As Long
nNewTimeStamp = objArch.IdMan.GetTimeStamp

GetTrackingNbr ( )

Syntax:

Public Function GetTrackingNbr( )
End Function
Example:

Set objTechArch = New CTechArch
sUniqueTrackNum = objTechArch.IdMan.GetTrackingNbr GetUniqueId ( )

Syntax:

Public Function GetUniqueId( )
End Function
Example:

Dim vUid As Variant
vNewUid = objArch.IdMan.GetUniqueId

RegMan

The following are APIs located on the interface of the Arch Object 200 named RegMan 506:

GetCacheLife( );
GetClientDSN( );
GetComputerName( );
GetDefaultAndValidate( );
GetFCArchiveDirectory( );
GetFCDistributionDirectory( );
GetFCMasterDirectory( );
GetFCUserDirectory( );
GetFCWorkingDirectory( );
GetHelpPath( );
GetLocalInfo( );
GetLogLevel( );
GetRegionalInfo( );
GetRegValue( );
GetServerDSN( );
GetSetting( );
GetTimerLogLevel( );
GetTimerLogPath( ); and
GetUseLocalCodes( ).

GetCacheLife( )

Syntax:

Public Function GetCacheLife( ) As String
End Function
Example:

Dim s As String
s = objArch.RegMan.GetCacheLife

GetClientDSN( )

Syntax:

Public Function GetClientDSN( ) As String
End Function
Example:

Dim s As String
s = objArch.RegMan.GetClientDSN

GetComputerName( )

Syntax:

Public Function GetComputerName( ) As String
End Function
Example:

Dim s As String
s = objArch.RegMan.GetComputerName

GetDefaultAndValidate( )

Syntax:

Private Function GetDefaultAndValidate(sKey As String) As String
End Function
Parameters:

sKey: The key within the registry of which the user is requesting (i.e.: Help Path)
Example:

Dim sDefault As String
sDefault = objArch.RegMan.GetDefaultAndValidate(sKey)

GetFCArchiveDirectory( )

Syntax:

Public Function GetFCArchiveDirectory( ) As String
End Function
Example:

Dim s As String
s = objArch.RegMan.GetFCArchiveDirectory

GetFCDistributionDirectory( )

Syntax:

Public Function GetFCDistributionDirectory( ) As String
End Function
Example:

Dim s As String
s = objArch.RegMan.GetFCDistributionDirectory

GetFCMasterDirectory( )

Syntax:

Public Function GetFCMasterDirectory( ) As String
End Function
Example:

Dim s As String
s = objArch.RegMan.GetFCMasterDirectory

GetFCUserDirectory( )

Syntax:

Public Function GetFCUserDirectory( ) As String
End Function
Example:

Dim s As String
s = objArch.RegMan.GetFCUserDirectory

GetFCWorkingDirectory( )

Syntax:

Public Function GetFCWorkingDirectory( ) As String
End Function
Example:

Dim s As String
s = objArch.RegMan.GetFCWorkingDirectory

GetHelpPath( )

Syntax:

Public Function GetHelpPath( ) As String
End Function
Example:

Dim s As String
s = objArch.RegMan.GetHelpPath

GetLocalInfo( )

Syntax:

Public Function GetLocalInfo( ) As String
End Function
Example:

Dim s As String
s = objArch.RegMan.GetLocalInfo

GetLogLevel( )

Syntax:

Public Function GetLogLevel( ) As String
End Function
Example:

Dim s As String
s = objArch.RegMan.GetLogLevel

GetRegionalInfo( )

Allows access to all locale specific values which are set from control panel.

Syntax:

Public Function GetRegionalInfo(Info As RegionaInfo) As String
End Function
Parameters:

Info: string containing the regional information. Several of the valid constants include:
cmLanguageId = &H1            language id
cmLanguageLocalized = &H2     localized name of language
cmLanguageEnglish = &H1001    English name of language
cmLanguageAbbr = &H3          abbreviated language name
cmLanguageNative = &H4        native name of language
Example:

Dim s As String
s = objArch.RegMan.GetRegionalInfo

GetRegValue( )

Syntax:
Public Function GetRegValue ( ) As String
End Function
Example:
Dim s As String
s = objArch.RegMan.GetRegValue GetServerDSN( )

Syntax:
Public Function GetServerDSN ( ) As String
End Function
Example:
Dim s As String
s = ObjArch.RegMan.GetServerDSN GetSetting( )

Get setting from the registry.

Syntax:
Public Function GetSetting (sKey As String) As String
End Function
Parameters:
sKey:    The key within the registry of which the user is requesting (i.e.: Help Path)
Parameters:
GetHelpPath = Getsetting (cmRegHelpPathKey)

GetTimerLogLevel( )

Syntax:
Public Function GetTimerLogLevel ( ) As String
End Function
Example:
Dim s As String
s = objArch.RegMan.GetTimerLogLevel GetTimerLogPath( )

Syntax:
Public Function GetTimerLogpath ( ) As String
End Function
Example:
Dim s As String
s = objArch.RegMan.GetTimerLogPath GetUseLocalCodes( )

Syntax:
Public Function GetUseLocalCodes ( ) As string
End Function
Example:
Dim s As String
s = objArch.RegMan.GetUseLocalCodes LPSTRToVBString( )

Extracts a VB string from a buffer containing a null terminated string.

Syntax:
Private Function LPSTRToVBString$ (ByVal s$)
End Function

LogMan

The following are APIs located on the interface of the Arch Object 200 named LogMan 508:

LogMessage ( );
WriteToDatabase( ); and
WriteToLocalLog( ).

LogMessage( )

Used to log the message. This function will determine where the message should be logged, if at all, based on its severity and the vMsg's log level.

```
Syntax:
    Public Sub LogMessage (vMsg As Variant, _
            lSeverity As Long, _
            sClassName As String, _
            sMethodName As String, _
            sVersion As String, _
            lErrorNum As Long, _
            Optional sText As String = vbNullString)
    End Sub
Parameters:
    vMsg: the standard architecture message
    lSeverity: the severity of the message
    sClassName: the name of the class logging the message
    sMethodName: the name of the method logging the message
    sVersion: the version of the binary file (EXE or DLL) that contains
    the method logging message
    lErrorNum: the number of the current error
    sText: an optional parameter containing the text of the message.
    If omitted, the text will be looked up in a string file or the
    generic VB error description will be used
Example:
    If Err.Number < > 0 Then
        ' log message
        Arch.LogMan.LogMessage (vMsg, cmSeverityFatal,
        "COrganizationCTLR",
    "InitForm",
            GetVersion ( ), Err.Number, Err.Description)
        ' re-raise the error
        Err.Raise Err.Number
    End If
```

WriteToDatabase ( )

Used to log the message to the database on the server using the CLoggingComp.

This function returns the TrackingId that is generated by the CLoggingObject.

```
Syntax:
    Private Sub WriteToDatabase (vMsg As Variant, msgToLog
    As CMessage)
    End Sub
Parameters:
    vMsg: the standard architecture message
    msgToLog: a parameter containing the text of the message.
Example:
    If msgToLog.IsLoggableAtLevel (m_lLocalLogLevel) Then
        WriteToDatabase vMsg, msgToLog
    End If
```

WriteToLocalLog ( )

Used to log the message to either a flat file, in the case of Windows 95, or the NT Event Log, in the case of Windows NT.

```
Syntax:
    Private Sub WriteToLocalLog (msgToLog As CMessage)
    End Sub
Parameters:
    msgToLog: a parameter containing the text of the message.
Example:
    ErrorHandler:
        WriteToLocalLog msgToLog
    End Sub
```

ErrMan

The following are APIs located on the interface of the Arch Object 200 named ErrMan 510:
HandleError( );
RaiseOriginal( );
ResetError( ); and
Update( ).

HandleError( )

This method is passed through to the general error handler in MArch.bas.

```
Syntax:
    Public Function HandleError (vMsg As Variant,
    nCompType As CompType, sClassName
    As String, sMethodName As String) As ErrResumeCodes
    End Sub
Parameters:
    vMsg:       General Architecture Information
    nCompType: Contains tier information (Client or Server)
    sClassName:    Class which raised the error.
    sMethodName:   Method which raised the error.
```

RaiseOriginal( )

This method is used to Reset the error object and raise.

```
Syntax:
    Public Sub RaiseOriginal ( )
    End Sub
Example:
    objArch.ErrMan.RaiseOriginal
```

ResetError( )

This method is used to reset attributes.

```
Syntax:
    Public Sub ResetError ( )
    End Sub
Example:
    objArch.ErrMan.ResetError
```

Update( )

This method is used to update attributes to the values of VBs global Error object.

```
Syntax:
    Public Sub Update ( )
    End Sub
Example:
    objArch.ErrMan.Update
```

UserMan

The following are APIs located on the interface of the Arch Object 200 named UserMan 512.
UserId;
EmployeeId;
EmployeeName;
EmployeeFirstName;
EmployeeLastName;
EmployeeMiddleInitial;
GetAuthorizedEmployees;
IsSuperOf ( );
IsRelativeOf( ); and
IsInRole( ).

UserId( )

```
Syntax:
    Public Property Get UserId ( ) As String
    End Property
Example:
    Dim sNewUserId As String
    sNewUserId = objArch.UserMan.UserId
```

EmployeeId( )

```
Syntax:
    Public Property Get EmployeeId ( ) As String
    End Property
Example:
    Dim sNewEmployeeId As String
    sNewEmployeeId = objArch.UserMan.EmployeeId
```

EmployeeName( )

```
Syntax:
    Public Property Get EmployeeName ( ) As String
    End Property
Example:
    Dim sName As String
    sName = objArch.UserMan.EmployeeName
```

EmployeeFirstName( )

```
Syntax:
    Public Property Get EmployeeFirstName ( ) As String
    End Property
Example:
    Dim sFName As String
    sFName = objArch.UserMan.EmployeeFirstName
```

EmployeeLastName( )

```
Syntax:
    Public Property Get EmployeeLastName ( ) As String
    End Property
Example:
    Dim sLName As String
    sLName = objArch.UserMan.EmployeeLastName
```

EmployeeMiddleInitial( )

```
Syntax:
    Public Property Get EmployeeMiddleInitial ( ) As String
    End Property
Example:
    Dim sMI As String
    sMI = objArch.UserMan.EmployeeMiddleInitial
```

GetAuthorizedEmployees( )
Creates a collection of user's supervisees from the dictionary and returns GetAuthorizedEmployees—collection of authorized employees

```
Syntax:
    Public Function GetAuthorizedEmployees ( ) As CCollection
    End Function
Example:
    Dim colAuth As Collection
    colAuth = objArch.UserMan.GetAuthorizedEmployees
```

IsSuperOf ( )
Checks if the current user is supervisor of the passed in user.

```
Syntax:
    Public Function IsSuperOf (sEmpId As String) As Boolean
    End Function
Parameters:
    sEmpid: string containing Employee ID number
Example:
    Dim bIsSuperOfMonika As Boolean
    bIsSuperOfMonika = objArch.UserMan.IsSuperOf ("TS012345")
```

IsRelativeOf ( )
Checks if the passed in user is relative of the current user.

```
Syntax:
    Public Function IsRelativeOf (sEmpId As string) As Boolean
    End Function
Parameters:
    sEmpId: string containing Employee ID number
Example:
    Dim bIsRelativeOfMonika As Boolean
    bIsRelativeOfMonika = objArch.UserMan.IsRelativeOf ("TS012345")
```

Is In Role ( )
Checks to see if the current

```
Syntax:
    Public Function IsInRole (sRole As string) As Boolean
    End Function
Parameters:
    sRole: string containing role
Example:
    Dim bIsInRoleTaskLibrarian As Boolean
    bIsInRoleTaskLibrarian = objArch.UserMan.IsInRole ("TA")
```

SecurityMan

The following APIs are located on the interface of the Arch Object 200 named SecurityMan 514.
EvalClaimRules;
EvalFileNoteRules;
EvalFormsCorrRules;
EvalOrgRules;
EvalRunApplicationRules;
EvalRunEventProcRules;
EvalTaskTemplateRules;
EvalUserProfilesRules;
IsOperAuthorized;
GetUserId; and
OverrideUser.

EvalClaimRules ( )

This API references business rules for Claim security checking and returns a boolean if rules are met.

```
Syntax:
    Private Function EvalClaimRules (lBasicOp As cmBasicOperations,
    vContextData As Variant) As Boolean
    End Function
Parameters:
    lBasicOp: a basic operation the current user is wishing to
    perform (i.e. Delete)
    vContextData: a variant array holding relevant business objects
    or other information.
Example:
    Select Case lOperation
    Case cmWorkOnClaim
        IsOperAuthorized = EvalClaimRules (cmView, vContextData)
        And _ EvalClaimRules (cmEdit, vContextData)
```

EvalFileNoteRules ( )

This API references business rules for FileNote security checking and returns a boolean if rules are met.

```
Syntax:
    Private Function EvalFileNoteRules (lBasicOp As
    cmBasicOperations, vContextData As Variant) As Boolean
    End Function
Parameters:
    lBasicOp: a basic operation the current user is wishing to
    perform (i.e. Delete)
    vContextData: a variant array holding relevant business objects
    or other information.
Example:
    Select Case lOperation
    Case cmDeleteFileNote
        IsOperAuthorized = EvalFileNoteRules (cmDelete,
        vContextData)
```

EvalFormsCorrRules ( )

This API references business rules for Forms and Corr security checking and returns a boolean if rules are met.

```
Syntax:
    Private Function EvalFormsCorrRules (lBasicOp As
    cmBasicOperations) As Boolean
    End Function
Parameters:
    lBasicOp: a basic operation the current user is wishing to
    perform (i.e. Delete)
Example:
    Select Case lOperation
    Case cmMaintainFormsCorr
        IsOperAuthorized = EvalFormsCorrRules (cmEdit) And _
                           EvalFormsCorrRules (cmDelete) And _
                           EvalFormsCorrRules (cmAdd)
```

EvalOrgRules ( )

This API references business rules for Event Processor security checking and returns a boolean if rules are met.

```
Syntax:
    Private Function EvalOrgRules (lBasicOp As cmBasicOperations)
    As Boolean
    End Function
Parameters:
    lBasicOp: a basic operation the current user is wishing to
    perform (i.e. Delete)
```

```
Example:
    Select Case lOperation
    Case cmMaintainOrg
        IsOperAuthorized = EvalOrgRules (cmAdd) And _
                           EvalOrgRules (cmEdit) And _
                           EvalOrgRules (cmDelete)
```

EvalRunApplicationRules ( )

This API references business rules for running the application and returns a boolean if rules are met.

```
Syntax:
    Private Function EvalRunApplicationRules (lBasicOp As
    cmBasicOperations) As Boolean
    End Function
Parameters:
    lBasicOp: a basic operation the current user is wishing to
    perform (i.e. Delete)
Example:
    Select Case lOperation
    Case cmRunApplication
        IsOperAuthorized = EvalRunApplicationRules (cmExecute)
```

EvalRunEventProcRules ( )

This API references business rules for Event Processor security checking and returns a boolean if rules are met.

```
Syntax:
    Private Function EvalRunEventProcRules (lBasicOp As
    cmBasicOperations) As Boolean
    End Function
Parameters:
    lBasicOp: a basic operation the current user is wishing to
    perform (i.e. Delete)
Example:
    Select Case lOperaton
    Case cmRunEventProcessor
        IsOperAuthorized = EvalRunEventProcRules (cmExecute)
```

EvalTaskTemplateRules ( )

This API references business rules for Task Template security checking and returns a boolean if rules are met.

```
Syntax:
    Private Function EvalTaskTemplateRules(lBasicOp As
    cmBasicOperations) As Boolean
    End Function
Parameters:
    lBasicOp: a basic operation the current user is wishing to perform (i.e.
    Delete)
Example:
    Select Case lOperation
    Case cmMaintainTaskLibrary
        IsOperAuthorized = EvalTaskTemplateRules(cmAdd) And _
                           EvalTaskTemplateRules(cmEdit) And _
                           EvalTaskTemplateRules(cmDelete)
```

EvalUserProfileRules ( )

This API references business rules for Task Template security checking and returns a boolean if rules are met.

```
Syntax:
    Private Function EvalUserProfileRules(lBasicOp As
    cmBasicOperations, vContextData As Variant) As Boolean
    End Function
```

-continued

Parameters:
   lBasicOp: a basic operation the current user is wishing to perform (i.e. Delete)
   vContextData: a variant array holding relevant business objects or other information.
Example:
   Select Case lOperation
   Case cmIsRelativeOf
      IsOperAuthorized = EvalUserProfileRules(cmView, vContextData)
      And _
                 EvalUserProfileRules(cmAdd, vContextData)
      And _
                 EvalUserProfileRules(cmEdit, vContextData)
      And _
                 EvalUserProfileRules(cmDelete, vContextData)

GetUserId ( )

Returns the login name/user id of the current user.

```
Syntax:
    Public Function GetUserId() As String
    End Function
Example:
    Dim sUserId as String
    sUserId = GetUserId
```

IsOperAuthorized ( )

This API references business rules and returns a boolean determining whether the user has security privileges to perform a certain operation.

```
Syntax:
    Public Function IsOperAuthorized(vMsg, as variant, nOperation
    as cmOperations, vContext As Variant) As Boolean
    End Function
Parameters:
    vMsg: the standard architecture message
    nOperation: an enumeration containing name of operation to be checked.
    vContext: a variant array holding relevant business objects or other information.
Example:
    Dim bCanIDoThis As Boolean
    bCanIDoThis = objArch.SecurityMan.IsOperAuthorized(vMsg,
    aOperationName, vContext)
    TlbEditIcon.Enabled = bCanIDoThis
```

OverrideUser ( )

Re-initializes for a different user.

```
Syntax:
    Public Sub OverrideUser(Optional sUserId As String, Optional
    dictRoles As CDictionary, Optional dictSubs As CDictionary)
    End Function
Parameters:
    sUserId:
    dictRoles:
    dictSubs:
Example:
    Dim x As New CTechArch
        x.SecurityMan.OverrideUser "Everyone", New CDictionary,
        New CDictionary
```

Codes Framework

General Requirements

Separate tables (CodesDecodes) are Created for storing the static values.

Only the references to codes/decodes are stored in business tables (e.g., Task) which utilize these values. This minimizes the size of the business tables, since storing a Code value takes much less storage space than its corresponding Decode value (erg., For State, "AL" is stored in each table row instead of the string "Alabama").

CodeDecodes are stored locally on the client workstation in a local DBMS. On Application startup, a procedure to ensure the local tables are in sync with the central DBMS is performed.

Infrastructure Approach

Figure 6:
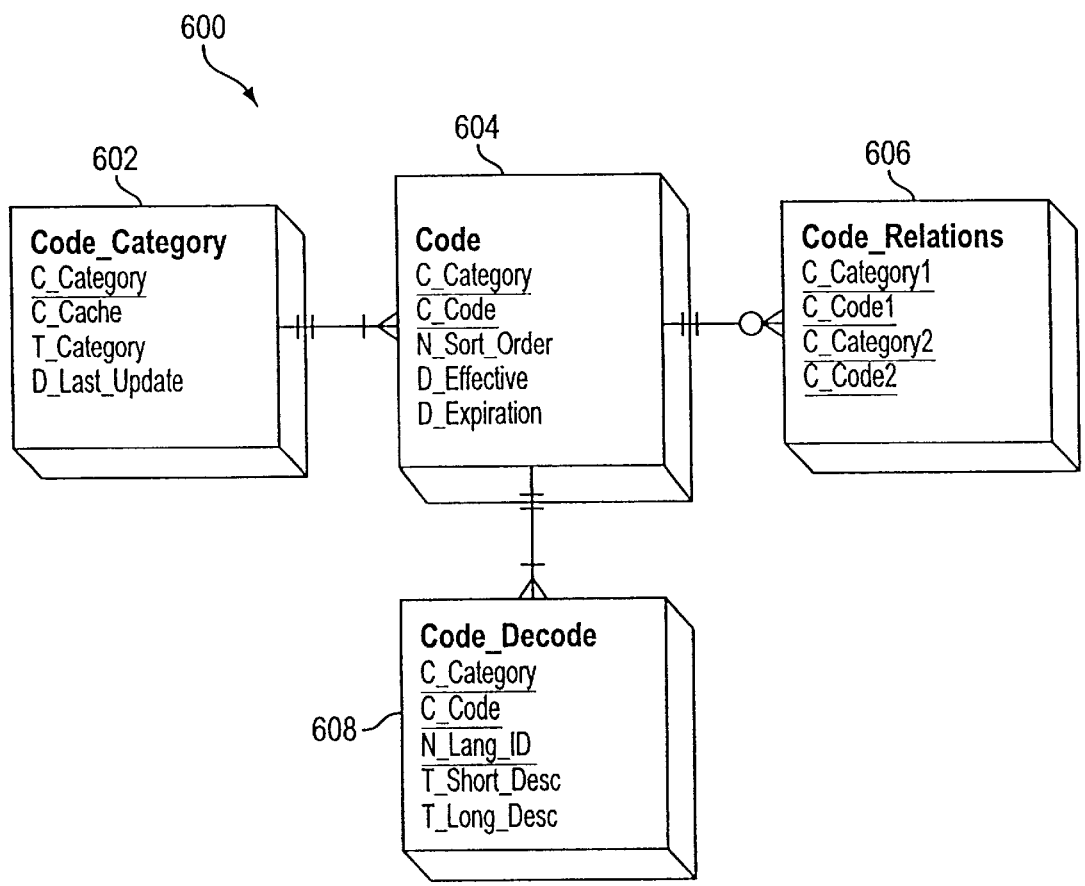
FIG. 6 is an illustration showing the physical layout of CodeDecode tables according to one embodiment of the present invention.

The present invention's Code Decode Infrastructure 600 Approach outlines the method of physically modeling codes tables. The model allows codes to be extended with no impact to the physical data model and/or application and architecture. FIG. 6 shows the physical layout of CodeDecode tables according to one embodiment of the present invention.

Infrastructure

The physical model of the CodeDecode infrastructure 600 does the following:

Supports relational functionality between CodeDecode objects;

Supports extensibility without modification to the DBMS or Application Architecture;

Provides a consistent approach for accessing all CodeDecode elements; and

Is easily maintainable.

These generic tables are able to handle new categories, and modification of relationships without a need to change the DBMS or CodeDecode Application Architecture.

Benefits of this model are extensibility and maintainability. This model allows for the modifications of code categories without any impact to the DBMS or the Application Architecture code. This model also requires fewer tables to maintain. In addition, only one method is necessary to access CodeDecodes.

Table Relationships and Field Descriptions (pk) indicates a Primary Key

Code_Category 602

C_Category (pk): The category number for a group of codes

C_Cache (currently not utilized): Can indicate whether the category should be cached in memory on the client machine T_Category: A text description of the category (e.g., Application Task Types, Claim Status, Days of Week)

D_Last_Update: The date any data within the given category was last updated; this field is used in determining whether to update a category or categories on the local data base Relationships A one-to-many relationship with the table Code (i.e., one category can have multiple codes)

Code 604

C_Category (pk): The category number for a group of codes

C_Code (pk): A brief code identifier (up to ten characters; the current maximum length being used is five characters)

D_Effective: A date field indicating the code's effective date

D_Expiration: A date field indicating the code's expiration date (the default is Jan. 1, 2999)

Relationships

A many-to-one relationship with Code_Category 602 (described above)

A one-to-many relationship with Code_Relations 606 (a given category-and-code combination can be related to multiple other category-and-code combinations)

Code_Relations 606

C_Category1 (pk): The first category

C_Code1 (pk): The first code

C_Category2 (pk): The related category

C_Code2 (pk): The related code

Relationships

A many-to-one relationship with the Code table (each category and code in the Code table can have multiple related category-code combinations)

Code_Decode 608

C_Category (pk): The category number for a group of codes

C_Code (pk): A brief code identifier (up to ten characters; the current maximum length being used is five characters)

N_Lang_ID (pk): A value indicating the local language setting (as defined in a given machine's Regional Settings). For example, the value for English (United States) is stored as 0409. Use of this setting allows for the storage and selection of text code descriptions based on the language chosen T_Short_Desc: An abbreviated textual description of C_Code T_Long_Desc: A full-length textual description of C_Code—what the user will actually see (e.g., Close Supplement—Recovery, File Note, Workers Compensation)

Localization Support Approach

Enabling Localization

Codes have support for multiple languages. The key to this feature is storing a language identifier along with each CodeDecode value. This Language field makes up a part of the compound key of the Code_Decode table. Each Code API lookup includes a system level call to retrieve the Language system variable. This value is used as part of the call to retrieve the values given the correct language.

Maintaining Language Localization Setting

A link to the Language system environment variable to the language keys is stored on each CodeDecode. This value is modified at any time by the user simply by editing the regional settings User Interface available in the Microsoft Windows Control Panel folder.

Codes Expiration Approach

Handling Time Sensitive Codes becomes an issue when filling controls with a list of values. One objective is to only allow the user to view and select appropriate entries. The challenge lies in being able to expire Codes without adversely affecting the application. To achieve this, consideration is given to how each UI will decide which values are appropriate to show to the user given its current mode.

The three most common UI modes that affect time sensitive codes are Add Mode, View Mode, and Edit Mode.

Add Mode

In Add Mode, typically only valid codes are displayed to the user as selection options. Note that the constant, cmValidCodes, is the default and will still work the same even when this optional parameter is omitted.

Set colStates=objArch.CodesMan.FillControl (frmCurrentForm.cboStates, cmCatStates, cmLongDecode, cmValidCodes)

View Mode

In View Mode, the user is typically viewing results of historical data without direct ability to edit. Editing selected historical data launches another UI. Given this the controls are filled with valid and expired codes, or in other words, non-pending codes.

Set colStates=objArch.CodesMan.FillControl (frmCurrentForm.cboStates, cmCatStates, cmLongDecode, cmNonPendingCodes)

Edit Mode

In Edit Mode, changes are allowed to valid codes but also expired codes are displayed if already assigned to the entity.

Dim colAssignedCodes As New cCollection colAssignedCodes.Add HistoricalAddress.State Set colStates=objArch.CodesMan.FillControl (frmCurrentForm.cboStates, cmCatStates, cmLongDecode, cmValidCodes, colAssignedCodes)

Updating Local CodeDecodes

Figure 7:
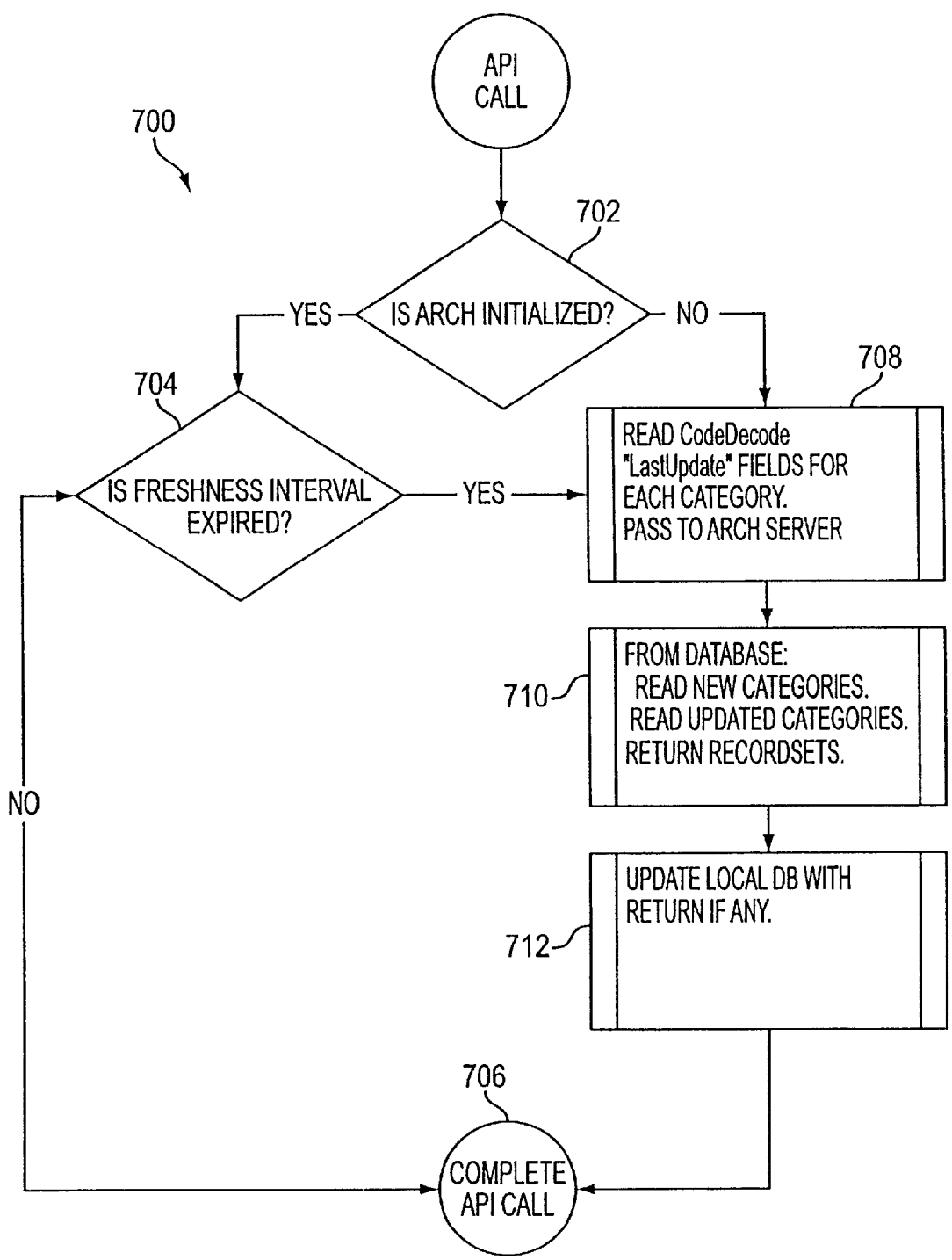
FIG. 7 is a logic diagram according to one embodiment of the present invention.

The Local CodeDecode tables are kept in sync with central storage of CodeDecodes. The architecture is responsible for making a check to see if there are any new or updated code decodes from the server on a regular basis. The architecture also, upon detection of new or modified CodeDecode categories, returns the associated data, and performs an update to the local database. FIG. 7 is a logic diagram for this process 700.

After an API call, a check is made to determine if the Arch is initialized 702. If it is a check is made to determine if the Freshness Interval has expired 704. If the Freshness Interval has not expired, the API call is complete 706. However, if either the Arch is not initialized or the Freshness Interval has expired, then the "LastUpdate" fields for each category are read from the CodeDecode and passed to the server 708. Then new and updated catagories are read from the database 710. Finally the Local database is updated 712.

Code Access APIs

The following are APIs located on the interface of the Arch Object 200 named CodesMan 500.

GetCodeObject(nCategory, sCode);

GetCategoryCodes(nCategory);

FillControl(ctlControl, nCategory, nFillType, [nCodeStatus], [colAssignedCodes]).

GetCodeObject: Returns a valid CCode object given a specific category and code.

Syntax:
    GetCodeObject(nCategory, sCode)
Parameters:
    nCategory: The integer based constant which classified these CodeDecodes from others.
    sCode: A string indicating the Code attribute of the CodeDecode object.
Example:
    frmCurrentForm.lblState = objArch.CodesMan.GetCodeObject (cmCatStates, "IL").LongDecode GetCategoryCodes: Returns a collection of CCode objects given a valid category Syntax:
    GetCategoryCodes(nCategory)
Parameters:
    nCategory: The integer based constant which classified these CodeDecodes from others.
Example:
    Dim ColMyStates As CCollection
    Set colMyStates = objArch.CodesMan.GetCategory(cmCatStates)

FillControl: This API is used to fill listboxes or comboboxes with values from a list of CodeDecodes. Returns a collection for subsequent lookups to Code objects used to fill controls.

Syntax:
    FillControl(ctlControl, nCategory, nFillType, [nCodeStatus], [colAssignedCodes])
Parameters:
    ctlControl: A reference to a passed in listbox or combobox.
    nCategory: The integer based constant which classified these CodeDecodes from others.
    nFillType: The attribute of the CodeDecode which you want to fill.
    Valid values include:
        cmCode
        cmShortDecode
        cmLongDecode
    nCodeStatus: Optional value which filters the Code Decodes according to their Effective and Expiration dates. Valid constants include the following:
        cmAllCodes           Pending + Valid + Expired Codes
        cmPendingCodes       Codes whose effective date is greater than the current date
        cmValidCodes         Not Pending or Expired Codes
        cmExpiredCodes       Codes whose expired date is greater than the current date
        cmNonPendingCodes    Valid + Expired Codes
        cmNonValidCodes      Pending + Expired Codes
        cmNonExpiredCodes    Pending + Valid Codes
    colAssignedCodes: Used when filling a control which should fill and include assigned values.
Example:
    'Declare an instance variable for States collection on object
    Private colStates As CCollection
    'Call FillControl API, and set local collection inst var to collection of codes which were used to fill the control. This collection will be used for subsequent lookups.
    Set colStates =
    objArch.CodesMan.FillControl(frmCurrentForm.cboStates,
    cmCatStates, cmLongDecode)
    'Below shows an example of looking up the Code value for the currently selected state.
    With frmCurrentForm.cboStates
        If  .ListIndex > -1 Then
            Dim objCode As CCode
            Set objCode = colStates(.ItemData(.ListIndex))
            sStateCode = objCode.Code
        End If
    End With

Relational Codes Access APIs

Code objects returned via the "GetCodeObject" or "GetCategoryCodes" APIs can have relations to other code objects. This allows for functionality in which codes are associated to other individual code objects.

The APIs used to retrieve these values are similar to those on the CodesMan interface. The difference, however is that the methods are called on the Codes object rather that the CodesManager interface: Listed below again are the APIs.
    GetCodeObject(nCategory, sCode);
    GetCategoryCodes(nCategory);
    FillControl(ctlControl, nCategory, nFillType, [nCodeStatus], [colAssignedCodes]).

Given below is some sample code to illustrate how these APIs are also called on Code objects.

GetCodeObject Example:
    Dim objBondCode As CCode
    Set objBondCode = objArch.CodesMan.GetCodeObject(cmCatLOB, "B")
    Dim objSuretyCode As CCode
    Set ObjSuretyCode = objBondCode.GetCodeObject(cmCatSupplement, "B01")
GetCategory Example:
    Dim objBondCode As CCode
    Set objBondCode = objArch.CodesMan.GetCodeObject(cmCatLOB, "B")
    Dim colSupplements As CCollection
    Set colSupplements = objBondCode.GetCategory(cmCatSupplement)
FillControl Example:
    Dim objBondCode As CCode
    Set objBondCode = objArch.CodesMan.GetCodeObject(cmCatLOB, "B")
    Dim colSupplements As CCollection
    Set colSupplements =
    objBondCode.FillControl(frmForm.cboSupplements, cmCatSupplements, cmLongDecode)

Message Logging

The message logging architecture allows message logging in a safe and consistent manner. The interface to the message logging component is simple and consistent, allowing message logging on any processing tier. Both error and informational messages are logged to a centralized repository.

Abstracting the message logging approach allows the implementation to change without breaking existing code.

Best Practices

Messages are always logged by the architecture when an unrecoverable error occurs (i.e., the network goes down) and it is not explicitly handled. Message logging may be used on an as-needed basis to facilitate the diagnosis and fixing of SIRs. This sort of logging is especially useful at points of integration between classes and components. Messages logged for the purpose of debugging have a severity of Informational, so as not to be confused with legitimate error messages.

Usage

A message is logged by calling the LogMessage( ) function on the architecture.
Description of Parameters
    vMsg: the standard architecture message
    lSeverity: the severity of the message
    sClassName: the name of the class logging the message
    sMethodName: the name of the method logging the message
    sVersion: the version of the binary file (EXE or DLL) that contains the method logging the message
    lErrorNum: the number of the current error
    sText: an optional parameter containing the text of the message. If omitted, the text will be looked up in a string file or the generic VB error description will be used.

sText: an optional parameter containing the text of the message. If omitted, the text will be looked up in a string file or the generic VB error description will be used.

lLoggingOptions: an optional parameter containing a constant specifying where to log the message (i.e., passing cmLogToDBAndEventViewer to LogMessage will log the error to the database and the event viewer.)

Logging Levels

Before a message is logged, its severity is compared to the log level of the current machine. If the severity of the message is less than or equal to the log level, then the message is logged.

Valid values for the log level are defined as an enumeration in VB. They include:

| Value | Name | Description | Example |
|---|---|---|---|
| 0 | CmFatal | A critical condition that closes or threatens the entire system | Application Server crash |
| 1 | CmSevere | A condition that closes or threatens a major ccmponent of the entire system | Network failure |
| 2 | CmWarning | A warning that something in the system is wrong but it does not close or threaten to close the system | Optimistic locking error |
| 3 | CmInformational audit purposes | Notification of a particular occurrencefor logging and information | Developer debugging |

Example

```
If Err.Number <> 0 Then
    ' log message
       Arch.LogMan.LogMessage(vMsg, cmSeverityFatal,
"COrganizationCTLR", "InitForm",
              GetVersion(), Err.Number, Err.Description)
       ' re-raise the error
       Err.Raise Err.Number
End If
```

Database Log

The database log table is composed of the following fields:

| Field Name | Description |
|---|---|
| N_MSG_ID | Unique ID of the message |
| D_MSG | Date the message occurred |
| C_ERR_SEV | Severity of the error |
| N_USER_ID | Name of user wben error occurred |
| N_MACH_ID | Name of the machine that the error occurred on |
| M_CLASS | Name of the class that the error occurred in |
| M_METHOD | Name of the method that the error occurred in |
| N_CMPNT_VER | Version of the binary file that the error occurred in |
| C_ERR | Number of the error |
| T_MSG | Text of the message |

Local Log

Messages are always logged to the application server's Event Log; however this is not necessarily true for the database as noted by the optional parameter passed to LogMessage, lLoggingOptions. An administrator with the appropriate access rights can connect to the MTS application server remotely and view its Event Log. Only one MTS package contains the Event Log Component, so that errors will all be written to the same application server Event Log.

Events logged via Visual Basic always have "VBRuntime" as the source. The Computer field is automatically populated with the name of the computer that is logging the event (i.e., the MTS application server) rather than the computer that generated the event (typically a client computer).

The same event details that are written to the database are formatted into a readable string and written to the log. The text "The VB Application identified by . . . Logged:" is automatically added by VB; the text that follows contains the details of the message.

Data Access

All but a few exceptional cases use the "ExecuteQuery" API. This API covers singular database Operations in which there exists a single input and a single output. Essentially should only exclude certain batch type operations.

The Data Access Framework serves the purposes of performance, consistency, and maintainability.

Performance

The "ExecuteQuery" method incorporates usage patterns for using ADO in an efficient manner. Examples of these patterns include utilization of disconnected recordsets, and explicitly declaring, optional parameters which result in the best performance.

Consistency

This method provides a common interface for devel0pment of data access. Given a simple and stable data access interface, best practices can be developed and disseminated.

Maintainability

Since the method is located in a single location, it is very modularized and can be maintained with little impact to its callers.

Application servers often use the ActiveX Data Objects (ADO) data access interface. This allows for a simplified programming model as well as enabling the embodiments to utilize a variety of data sources.

The "ExecuteQuery" Method

Overview

The "ExecuteQuery" method should be used for most application SQL calls. This method encapsulates functionality for using ADO in a effective and efficient manner. This API applies to situations in which a single Operation needs to be executed which returns a single recordset object.

Syntax
  Set obj = ExecuteQuery(vMsg, nTranType, sSQL, [nMaxRows], [adoTransConn], [args])

Parameters
  vMsg
    This parameter is the TechArch struct. This is used as a token for information capture such as performance metrics, error information, and security.
  nTranType
    An application defined constant which indicates which type of Operation is being performed. Values for this parameter can be one of the following constants:
    cmSelect
    cmSelectLocal
    cmUpdate
    cmInsert
    cmDelete sSQL
String containing the SQL code to be performed against the DBMS.
nMaxRows (Optional)
Integer value which represent the maximum number of records that the recordset of the current query will return.
adoTransConn (Optional)
An ADO Connection object. This is created and passed into execute query for Operations which require ADO transactional control (see "Using Transactions" section)
args (Optional)
A list of parameters to be respectfully inserted into the SQL statement.

Implementation

In one embodiment of the present invention the "ExecuteQuery" method resides within the MservArch.bas file. This file should be incorporated into all ServerComponent type projects. This will allow each server component access to this method.

Note: Since this method is a public method in a "bas" module, it is globally available from anywhere in the project.

```
Public Function ExecuteQuery(vMsg As Variant, _
                nTranType As TranTypes, _
                sSQL As String, _
                Optional nMaxRows As Integer = 0, _
                Optional adoTransConn As ADODB.Connection, _
                Optional colArguments As CCollection) As Variant
    On Error GoTo ErrorHandler
    Const cmMethodName As String = "ExecuteQuery"
    StartTimeLogger vMsg, cmTimerIdDBTotal, cmClassName,
cmMethodName
    'find out if this call is an isolate operation or
    'part of an ADO (not MTS) transaction
    Dim isAtomicTrans As Boolean
    isAtomicTrans = adoTransConn Is Nothing
    Dim nRecordsAffected As Integer
    Dim adoRS As New ADODB.Recordset
    Dim adoConn As ADODB.Connection
    Dim lAuxErrNumber As Long
    'open a new connection or keep using the passed in connection
    Set adoConn = IIf(isAtomicTrans, New ADODB.Connection,
adoTransConn)
    If isAtomicTrans Then
        adoConn.Open cmODBC_Connect
        'ADO will wait indefinitely until the execution is complete during
performance
        testing
        #If IsPerfTest Then
            adoConn.CommandTimeout = 0
        #End If
    End If
    'Make sure date args are formatted for DB2 if appropriate
    If Not colArguments Is Nothing Then _
        Set colArguments = FormatArgsForDB2(colArguments)
    'merge the passed in arguments with the SQL string
    sSQL = MergeSQL(sSQL, colArguments)
    Debug.Print Time & ": " & sSQL
    'execute the SQL statement depending on the transaction type
    Select Case CStr(nTranType)
        Case cmSelect
            adoRS.MaxRecords = nMaxRows
            adoRS.CursorLocation = adUseClient
            adoRS.Open sSQL, adoConn, adOpenForwardOnly,
adLockReadOnly, adCmdText
            Set adoRS.ActiveConnection = Nothing
            Set ExecuteQuery = adoRS
        Case cmSelectLocal
            adoRS.MaxRecords = nMaxRows
            adoRS.CursorLocation = adUseClient
            adoRS.Open sSQL, adoConn, adOpenStatic,
```

-continued

```
adLockBatchOptimistic, adCmdText
            Set adoRS.ActiveConnection = Nothing
            Set ExecuteQuery = adoRS
        Case cmInsert
            Set adoRS = adoConn.Execute(sSQL, nRecordsAffected,
adCmdText)
            If nRecordsAffected <= 0 Then Err.Raise cmErrQueryInsert
            Set adoRs = Nothing
            ExecuteQuery = nRecordsAffected
        Case cmUpdate, cmDelete
            Set adoRS = adoConn.Execute(sSQL, nRecordsAffected,
adCmdText)
            If nRecordsAffected <= 0 Then Err.Raise cmErrOptimisticLock
            Set adoRS = Nothing
            ExecuteQuery = nRecordsAffected
        Case cmSpFileNote
            Set adoRS = adoConn.Execute(sSQL, nRecordsAffected,
adCmdText)
            Set adoRS = Nothing
        Case Else
            Err.Raise cmErrInvalidParameters
    End Select
    StopTimeLogger vMsg, cmTimerIdDBTotal, cmClassName,
cmMethodName
    Exit Function
ErrorHandler:
    Dim objArch As Object
    Set objArch = CreateObject("cmArch.CTechArch")
    Select Case CStr(Err)
        Case cmErrQueryInsert, cmErrOptimisticLock,
cmErrInvalidParameters
            'Raise error
            Err.Raise Err
        Case cmErrDSNNotFound
            Dim sMsgText As String
            sMsgText = "Data Source Name not found." & vbCrLf &
                       "( " & _ CStr(objArch.RegMan.GetServerDSN) & " )"
            'Create a new message log and log the message
            objArch.LogMan.LogMessage vMsg, cmSeverityFatal,
cmClassName, cmMethodName,
                       GetVersion(), cmErrDSNNotFound, sMsgText,
cmLogToEventViewerOnly
            lAuxErrNumber = adoConn.Errors(0).NativeError 'The error
code is stored since when closing the conection it will be lost
            If adoConn.State <> adStateClosed Then adoConn.Close
            Err.Raise cmErrDSNNotFound, , sMsgText
        Case Else
            ' Create a new message log and log the message
            objArch.LogMan.LogMessage vMsg, cmSeverityFatal,
cmClassName, cmMethodName,
                       GetVersion(), Err.Number, Err.Description,
cmLogToEventViewerOnly
            lAuxErrNumber = adoConn.Errors(0).NativeError 'The error
code is stored since when closing the conection it will be lost
            If adoConn.State <> adStateClosed Then adoConn.Close
            Err.Raise lAuxErrNumber
    End Select
End Function
```

Selecting Records

ExecuteQuery utilizes disconnected recordsets for "Select" type statements. This requires that the clients, particularly the CCA's contain a reference to ADOR, ActiveX Data Object Recordset. This DLL is a subset of the ADODB DLL. ADOR contains only the recordset object.

Using disconnected recordsets allows marshalling of recordset objects from sever to client. This performs much more efficiently than the variant array which is associated with using the "GetRows" API on the server. This performance gain is especially apparent when the application server is under load of a large number of concurrent users.

read timestamp is used to validate, during the update, that the record has not been modified since last time read.

```
Sample from Client Component Adapter (CCA)
    Dim vAns as Variant
    Dim adoRS As ADOR.Recordset
    Set adoRS = objServer.PerformSelect(vMsg, nId)
    If objRS.EOF Then
        Set objRS = Nothing
        Exit Function
    End If
    vAns = adoRS.GetRows
    Set adoRS = Nothing
    'Marshall vAns into objects
    . . .
Sample from Server Component
    Private Const cmCustSQL = "Select * from Customer where id = ?"
    Public Function PerformSelect(vMsg, nId) as Variant
        Dim colArgs as CCollection
        Set colArgs = New Ccollection
        colArgs.Add nId
        Set PerformSelect = ExecuteQuery(vMsg, cmSelect, sCustSQL, , ,colArgs)
    End Function
Code Clip from ExecuteQuery (Select Section)
    Case cmSelect
        adoRS.MaxRecords = nMaxRows
        adoRS.CursorLocation = adUseClient
        adoRS.Open sSQL, adoConn, adOpenForwardOnly, adLockReadOnly, adCmdText
        Set ExecuteQuery = adoRS
    . . .
```

Inserting Records

Inserting records requires certain information pertaining to optimistic locking. On the server a unique value is requested to indicate the last time modified. This unique value is returned back to the requestor such that it can be used to later database operations.

```
Sample from Client Component Adapter (CCA)
    Dim vNewTS as Variant
    vNewTS = objServer.PerformInsert(vMsg, nId, sName)
    'Set object's TimeStamp to vNewTS
Sample from Server Component
    Private Const cmCustInsertSQL = "Insert Customer (nId, Name, LastUpdated) Values(?, '?', ?)"
    Public Function PerformInsert(vMsg, nId, sName) As Variant
    Dim lCurrTS as Long
    lCurrTS = GetTimeStamp
    Dim colArgs as CCollection
    Set colArgs = New Ccollection
    colArgs.Add nId
    colArgs.Add sName
    colArgs.Add lCurrTS
    ExecuteQuery(vMsg, cmInsert, sCustInsertSQL, , , colArgs)
    PerformInsert = lCurrTS
Code Clip from ExecuteQuery (Insert Section)
    Case cmInsert
        Set adoRS = adoConn.Execute(sSQL, nRecordsAffected, adCmdText)
        If nRecordsAffected <= 0 Then Err.Raise cmErrQueryInsert
        Set adoRS = Nothing
        ExecuteQuery = nRecordsAffected
```

Updating Records

Updating records requires certain information pertaining to optimistic locking. On the server a unique value is requested to indicate the last time modified. Also the last

```
Sample from Client Component Adapter (CCA)
    Dim vNewTS as Variant
    vNewTS = objServer.PerformUpdate(vMsg, 1, 'Rick', 8907654)
    'Set object's TimeStamp to vNewTS
Sample Code Clip from Server Component
    Private Const cmCustUpdateSQL = _
    "Update Customer Set Name = '?', LastUpdated = ? " & _
    "Where Id = ? " & _
    "And LastUpdated = ? "
    Public Function PerformUpdate(vMsg, nId, sName, lLastTS) As Variant
        Dim lCurrTS as Long
        lCurrTS = GetTimeStamp
        Dim colArgs as CCollection
        Set colArgs = New Ccollection
        colArgs.Add sName
        colArgs.Add lCurrTS
        colArgs.Add nId
        colArgs.Add lLastTS
        PerformUpdate = ExecuteQuery(vMsg, cmUpdate, sCustUpdateSQL, , , colArgs)
        PerformUpdate = lCurrTS
    End Function
Code Clip from ExecuteQuery (Update Section)
    Case cmUpdate
        Set adoRS = adoConn.Execute(sSQL, nRecordsAffected, adCmdText)
        If nRecordsAffected < 0 Then Err.Raise cmErrOptimisticLock
        ExecuteQuery = nRecordsAffected
```

Deleting Records

In deleting records the last read timestamp is used to validate, during the delete, that the record has not been modified since last time read.

```
Sample from Client Component Adapter (CCA)
    Dim vAns as Variant
    vAns = objServer.PerformDelete(vMsg, nId ,lLastTS)
Sample from Server Component
    Private Const cmCustDeleteSQL = _
    "Delete From Customer " & _
    "Where Id = ? " & _
    "And LastUpdated = ? "
    Public Function PerformDelete(vMsg, nId lLastTS) As Variant
        Dim colArgs as CCollection
        Set colArgs = New Ccollection
        colArgs.Add nId
        colArgs.Add lLastTS
        PerformDelete = ExecuteQuery(vMsg, cmDelete, cmCustDeleteSQL)
    Exit Function
Code Clip from ExecuteQuery (Delete Section)
    Case cmDelete
        Set adoRS = adoConn.Execute(sSQL, nRecordsAffected, adCmdText)
        If nRecordsAffected < 0 Then Err.Raise cmErrOptimisticLock
        ExecuteQuery = nRecordsAffected
```

DATABASE LOCKING FRAMEWORK

Database Locking ensures the integrity of the database in a multi-user environment. Locking prevents the common problem of lost updates from multiple users updating the same record.

Solution Options
Pessimistic Locking

This policy of locking allows the first user to have full access to the record while following users are denied access or have read only access until the record is unlocked. There are drawbacks to this method of locking. It is a method that is prone to deadlocks on the database as well poor performance when conflicts are encountered.

Optimistic Locking

The optimistic approach to record locking is based on the assumption that it is not normal processing for multiple users to both read and update records concurrently. This situation is treated as exceptional processing rather than normal processing. Locks are not actually placed on the database at read time. A timestamp mechanism is used at time of update or delete to ensure that another user has not modified or deleted the record since you last read the record.

A preferred embodiment of the present invention uses an optimistic locking approach to concurrency control. This ensures database integrity as well as the low overhead associated with this form of locking. Other benefits to this method are increased availability of records to multiple users, and a minimization of database deadlocks.

Table candidates for concurrency control are identified during the "Data Modeling Exercise". The only table which is updated concurrently is the Optimistic Locking mechanism. Once these are identified, the following is added to the application.

Add "N_Last_Updt" field to table in database;

Error Handling routines on those operations which modify or delete from this table; and Display/Notification to user that the error has occurred.

Usage

The chart below describes the roles of the two basic types of components to enable optimistic locking.

Assumption: The optimistic locking field is of type Date and is named "N_Last_Updt"

such data will be slow to paint and searches will be slow. The formation of the database queries is made such that a workable amount of data is retrieved. There are a few options for addressing the problems that occur from large result sets. The options are given below in order of preference.

Redesign the interface/controller to return smaller result sets. By designing the controllers that present the database queries intelligently, the queries that are presented to the database server do not return a result set that is large enough to affect user perceived performance. In essence, the potential to retrieve too many records indicates that the UIs and the controllers have been designed differently. An example of a well designed Search UI is one where the user is required to enter in a minimum search criteria to prevent an excessively large result set.

Have Scrollable Result Sets. The scrolling retrieval of a large result set is the incremental retrieval of a result subset repeated as many times as the user requests or until the entire result set is obtained. Results are retrieved by the Bounded Query Approach where the first record is determined by a where clause with calculated values.

Scrollable Result Set Client requirements

Preferred UI

The preferred displays are as follows:

Returned results are displayed in a GreenTree List Box;

An action button with the label More . . . is provided for the user to obtain the remaining results;

The More button is enabled when the user has performed an initial search and there are still results to be retrieved;

The More button is disabled when there are no more results to retrieve;

|  | Client Components | Server Components |
|---|---|---|
| Read Access | Store N_Last_Updt value in the business object for use in possible updates or deletes. WHERE id = 10; | Retrieve data (Always including N_Last_Updt field). SELECT Id, FirstName, N_Last_Updt FROM Customer |
| Inserts | Normal | Dim lCurrTS As Double lCurrTS = GetTimeStamp INSERT INTO Customer (Id, FirstName, N_Last_Updt) VALUES (1, "Rick", lCurrTS); Return new timestamp (lCurrTS) as well as new Id |
| Updates | Pass previously read timestamp to identify whether row was modified. This is in addition to a unique identitier and whatever data needs to be updated. Handle exception if record has been previously modified. Notify user of conflict. Rollback any changes. | Dim lCurrTS As Double lCurrTS = GetTimeStamp UPDATE Customer SET firstName = "Richard", N_Last_Updt = lCurrTS WHERE id = 1 AND LastUpdate = lastReadTimestamp; If no rows are affected, handle and propagate error back out to the client. Return new timestamp (lCurrTS) |
| Deletes | Pass previously read timestamp to identify whether row was modified. This is in addition to a unique identifier Handle exception if record has been previously modified. Notify user of conflict Rollback any changes. | DELETE Customer WHERE id = 1 AND N_Last_Updt = lastReadTimestamp; If no rows are affected, handle and propagate error back out to the client. |

LARGE RESULT SET

When retrieving records from a database, if the search criteria is too broad, the amount of data required to be retrieved from the database and passed across the network will affect user perceived performance. Windows requesting The List Box and the Action button is contained within a group box to provide a visual association between the button and the List Box.

Bounded Query

Queries that are implemented with the limited result sets are sent to the server. The server implements the execute- Query method to retrieve the recordset as usual. Limited result queries have an order by clause that includes the business required sort order along with a sufficient number of columns to ensure that all rows can be uniquely identified. The recordset is limited by the nMaxRows variable passed from the client incremented to obtain the first row of the next result set. The return from the component is a recordset just the same as with a query that is not limited. The CCA 208 creates the objects and passes these back to the controller 206. The Controller 206 adds this returned collection of object to its collection of objects (an accumulation of previous results) and while doing so will performs the comparison of the last object to the first object of the next row. The values necessary to discriminate the two rows are added to the variant array that is necessary to pass to the component for the subsequent query.

The Controller 206 on the client retains the values for nMaxRows, the initial SQL statement, and array of values to discern between the last row of the previous query and the first row of the next query. The mechanism by which the controller 206 is aware that there are more records to retrieve is by checking the number of results is one greater than the max number of rows. To prevent the retrieval of records past the end of file, the controller 206 disables these functions on the UI. For example, a command button More on the UI, used to requested the data, is disabled when the number of objects returned is less than nMaxRows+1

Application responsibility

Server

The Server component is responsible for creating a collection of arguments and appending the SQL statement to add a where clause that will be able to discriminate between the last row of the previous query and the first row of the next.

CCA

The CCA 208 processes the recordset into objects as in non limited queries. The CCA 208 forwards the variant array passed from the Controller 206 to identify the limited results.

Controller

The controller 206 has the responsibility of disabling the More control when the end of file has been reached. The controller 206 populates the variant array (vKeys) with the values necessary to determine start of next query.

Example

A CCA 208 is coded for a user defined search which has the potential to return a sizable result set. The code example below implements the Bounded Query approach.

On the Server the developer codes the query as follows:

```
Public Function RetrieveBusinessObjects(vMsg As Variant, ByVal sSql
As String, ByVal nMaxRows As Integer, Optional ByVal vKeys As
Variant) As Recordset
    On Error GoTo ErrorHandler
    'Declare local constants
    Const cmMethodName As String = "RetrieveBusinessObjects"
    'Declare local variables
    Dim cmClassName As String
    Dim colArgs As New CCollection
    'initialize instance variables
    cmClassName = "CSRSTestComp"
    'fill argument collection
    Set colArgs = ArgumentsForBusinessObject(vKeys , sSQL)
    'increment nMaxRows to obtain row for comparison
    nMaxRows = nMaxRows + 1
    'ExecuteQuery
        Set RetrieveBusinessObjects = ExecuteQuery(vMsg,
```

-continued

```
cmSelectLocal, sQuery, nMaxRows, , colArgs)
    'Tell MTS we're done
    GetObjectContext.SetComplete
    Exit Function
ErrorHandler:
    Select Case Err.Number
        Case Else
            Dim iResumeCode As Integer
            iResumeCode = GeneralErrorHandler(vMsg, cmServer,
cmClassName, cmMethodName)
            Select Case iResumeCode
                Case cmErrorResume
                    Resume
                Case cmErrorResumeNext
                    Resume Next
                Case cmErrorExit
                    Exit Function
                Case Else
                    GetObjectContext.SetAbort
                    Err.Raise Err.Number
            End Select
    End Select
End Function
```

To determine the additional where clause necessary to determine the starting point of the query, the following method is added:

```
Private Function ArgumentsForBusinessObject(vKeys As Variant,
sSql As string )
As CCollection
    Dim colArgs As Ccollection
    Const cmGreaterThanWhereString As String = " ? > ? "
    Const cmGreaterThanOrEqualWhereString As String = " ? >= ? AND "
    ' initialize local variables
    Set colArgs = New Ccollection
    sSql = sSql + "WHERE"
    With colArgs
        If vKeys(0) <> Empty Then
            .Add ("N_TASK_TEMPL_ID")
            .Add (vKeys(0))
        End If
        'If vKeys(1) <> Nothing Then
            '.Add value2 fieldName
            '.add vKeys(1)
            sSql = sSql + cmGreaterThanOrEqualWhereString
        'End If
        'If vKeys(2) <> Nothing Then
            '.Add value3 fieldName
            '.add vKeys(2)
            sSql = sSql + cmGreaterThanOrEqualWhereString
        'End If
    End With
    'finalize SQL statement
    sSql = sSql + cmGreaterThanWhereString
    Set ArgumentsForBusinessObject = colArgs
End Function
```

On the CCA 208, allowance must be made for the passing of the vKeys

Public Function RetrieveBusinessObjects(vMsg As Variant, sSql As String, nMaxRows As Integer, Optional ByVal vKeys As Variant) As CCollection

```
Set percmpComponent = New CSRSTestComp
Dim i As Integer
Set adoRS = percmpComponent.RetrieveBusinessObjects(vMsg, sSql,
nMaxRows, vKeys)
    'convert recordset to business objects
```

```
-continued
    adoRS.MoveFirst
    Do Until adoRS.EOF
        Call ConvertToBusinessObject
        adoRS.MoveNext
    Loop
    'return the collection of business objects
    Set RetrieveBusinessObjects = dictBusinessObject
    Set dictBusinessObject = New CCollection
End Function
```

The controller initiates the query and updates the variant array of keys and form 204 properties based on the return. In addition to the code shown for the example below, the More Control is enabled if the search is cleared.

```
'declare instance variables
Private nMaxRows As Integer
Dim interimResults As CCollection
Dim vResults As CCollection
Dim vKeys(3) As Variant
'declare Constants
Private Const nDefaultAmount As Long = 50
Private Const cmRetrieveBusinessObjectSQL = "SELECT *
    FROM NODE_RULE ORDER BY_ N_TASK_TEMPL_ID"
```

During class initialization perform the following:

```
Public Sub Class_init()
    'obtain settings from registry
    nMaxRows = CInt(GetSetting(cmRegApp, cmRegArchSection,
cmLimitedResultAmountKey, lDefaultAmount))
    Call resetSearch
    Set objCCA = New {CCA class name}
End Sub
```

Search reset functionality is kept outside of initialization so this may be called from other parts of the application.

```
Public Sub resetSearch()
    Dim I as Integer
    Set vResults = New Ccollection
    For I = 0 To 3
        Set vKeys(I) = Empty
    Next
Set vKeys(0) = Empty
    frmCurrentForm.cmdMore.Enabled = True
End Sub
Public Sub RetrieveBusinessObjects()
    Const cmMethodName As String = "retrieveBusinessObjects"
    Call RetainMouse
    ' get arch message
    Dim vMsg As Variant
    vMsg = objApp.objArch.AsMsgStruct()
    ' call the component
    Dim pair As CArchPair
    Declare local variables
    Dim sSql As String
    Dim colArgs As CCollection
    Dim cmClassName As String
    Set interimResults = objCCA.RetrieveBusinessObjects(vMsg,
cmRetrieveBusinessObjectSQL, nMaxRows, vKeys)
    ctr = ProcessObjectCollection
    'stop if size of return is less than the maximum
        If ctr < nMaxRows + 1 Then frmCurrentForm.cmdMore.Enabled =
False
    ' restore pointer
    Screen.MousePointer = lPrevPtr
End Sub
```

In order to retain the values to discriminate between the last row of the result set and the first row of the next the following method on the controller is used:

```
Private Function ProcessObjectCollection( ) As Integer
' merge results with the instance variable for the collection
    Dim ctr As Integer
        ctr = 0
    For Each element In interimResults
        ctr = ctr + 1
        'retain Keys for subsequent Queries
        With element
        Select Case ctr
            Case nMaxRows
                'store all values that may be used for row
                comparison vKeys(0) = .NodeId
                'add last object to collection
                vResults.Add element
            Case nMaxRows + 1
                'last object only used for comparison
                'If the proceeding value can be used to uniquely
                'identify row then delete value from array
                ' THERE SHOULD BE N – 1 nested If statements
where N = size of vKeys
                    'If .value2 <> vKeys(1) Then
                        'vKeys(2) = Empty
                        If .NodeId <> vKeys(0) Then vKeys(1) = Empty
                    'End If
            Case Else
                vResults.Add element
        End Select
        End With
    Next
    ProcessObjectCollection = ctr
End Function
```

Operation of example with data

| Person First Name | Last Name | Status | Unique ID |
|---|---|---|---|
| Joy | Andersen | Closed | 22 |
| Jay | Anderson | Open | 12 |
| John | Barleycorn | Closed | 512 |
| John | Barleycorn | Open | 32 |
| Esther | Davidson | Open | 88 |
| David | Dyson | Closed | 98 |
| Bobby | Halford | Open | 234 |
| Steven | Jackowski | Closed | 4 |
| Kyle | Johnsen | Open | 65 |
| Jeff | Johansen | Open | 13 |
| Mary | Johnson | Closed | 24 |
| Larry | Olsen | Open | 21 |
| William | O'Neil | Closed | 29 |
| Jane | Pick | Open | 3285 |

For this example let nMaxRows=3. The business case calls for the result set to be ordered by the last name, and developer knows that any row can be uniquely identified by the FirstName, LastName, and Unique ID fields so the initial SQL added as a constant in the controller should be;
    SELECT * FROM Person ORDER BY LastName, FirstName, Unique_ID
Initial Query The first query is sent with an empty vKeys Array. When the server receives this query, the method ArgumentsForBusinessObject identifies the elements as being empty and does not populate the colArgs. The query is executed with the intial SQL unchanged. The recordset of size nMaxRows+1 is returned to the CCA 208 and processed the same as non-limited results. The CCA 208 returns the collection of objects to the controller 206. The controller 206 proceeds to populate the vResults collection with the returned objects. vResults is the comprehensive collection of objects returned. When the last object of the first request is reached (at nMaxRows), the values are stored in vKeys as such;

vKeys(0)=LastName (Barleycorn)

vKeys(1)=FirstName (John)

vKeys(2)=Unique_ID (512)

When the First Object of the next request is reached (at nMaxRows+1), comparison of the object variables against the vKeys values is performed. Because the last names match, vKeys(2) will not be deleted and no further checks are performed.

Subsequent Query

The subsequent query will pass vKeys along with it. The server creates the collection of arguments from vKeys and append the sSql string in accordance. The sSql statement that is passed to execute query is SELECT * FROM Person ORDER BY LastName, FirstName, Unique_ID WHERE ? >=? AND ? >=? AND ? >?

This sSql and collection is included in the call to ExecuteQuery which merges the arguments with the string relying on the architecture method MergeSQL to complete the SQL statement.

The starting point of the recordset is defined by the WHERE clause and the limit is set by the nMaxRows value.

Query Less Restrictive WHERE Criteria

After the second query the last row of the query is David Dyson and the next is Bobby Halford. Because the last name is different, vKeys will be empty except for vKeys(0)=Dyson.

The ProcessObjectCollection will populate vKeys as follows when processing nMaxRows object:

vKeys(0)=LastName (Dyson)

vKeys(l)=FirstName (David)

vKeys(2)=Unique_ID (98)

After identifying the differences between vKeys values and the nMaxRows+1 object the vKeys array is updated as follows:

vKeys(0)=LastName (Dyson)

vKeys(1)=Empty vKeys(2)=Empty

The query that is returned from ArgumentsForBusinessObject is

SELECT * FROM Person ORDER BY LastName, FirstName, Unique_ID WHERE ? >?

and the colArgs possessing the fieldname FirstName and the value ("David"). ExecuteQuery merges the arguments with the sql statement as before and returns the value.

Ending

After the fifth iteration the result set will only possess 2 records. When the controller 206 processes the returned collection the counter returned from ProcessObjectCollection is less than nMaxRows+1 which indicates that all records have been retrieved.

SECURITY FRAMEWORK

Implementation

Figure 8:
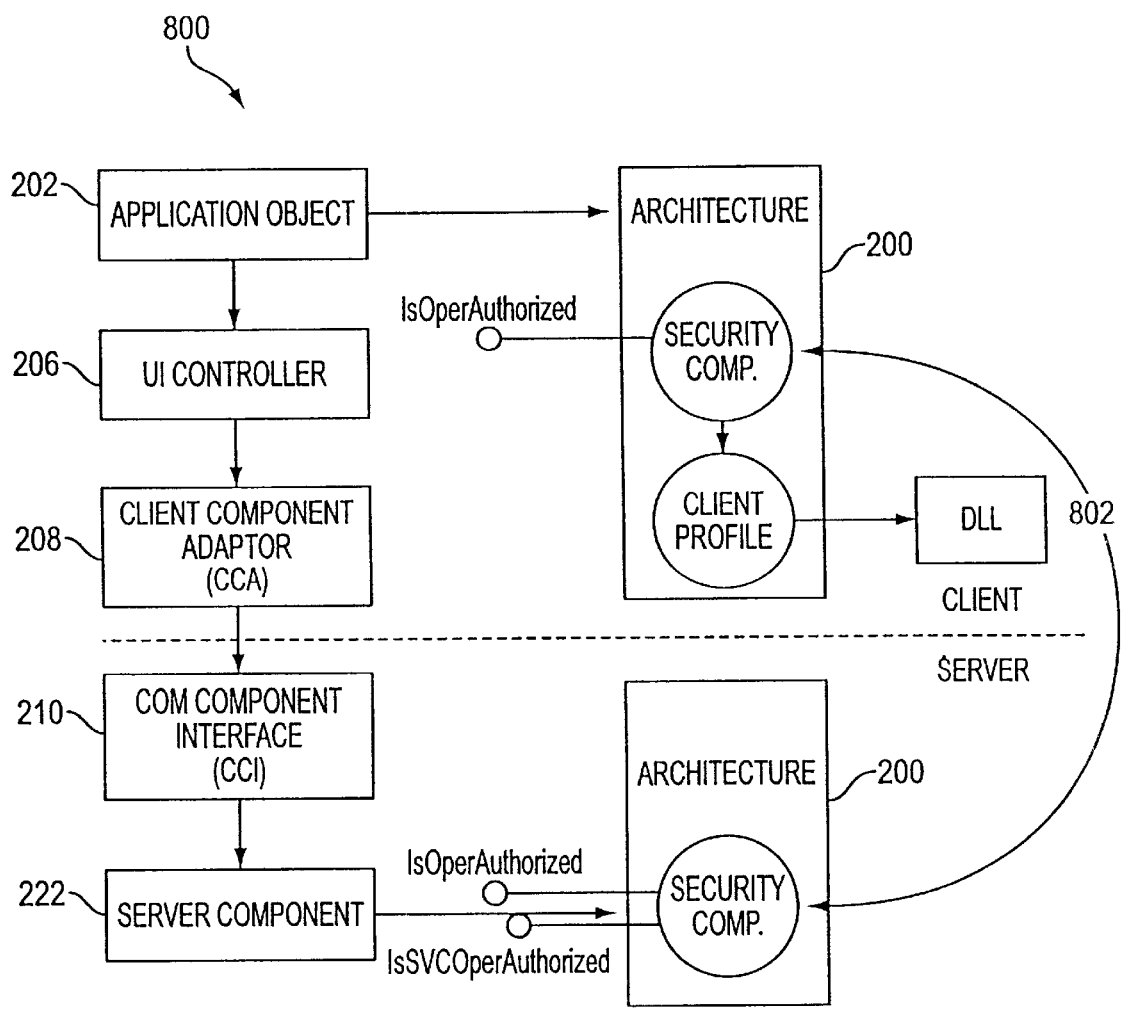
FIG. 8 is a block diagram of the security framework and its components.

FIG. 8 shows a representation of the Security Framework 800 and its main components.

It can be seen from FIG. 8 that the Security object 802 is present at the Client and a Security API is provided at the server. The Security object 802 provides one method responsible for authorizing any operation, being given the vMsg structure, an operation ID and an optional parameter describing the operation's context.

Client

User Authentication

User authentication is handled via a method located in the Security object 802 called IsOperAuthorized. As the Application object loads, it calls the IsOperAuthorized method, with the operation being "Login", before executing further processing. This method subsequently calls a authentication DLL, which is responsible for identifying the user as an authorized user within the Corporate Security.

UI Controllers

The UI Controllers limit access to their functions by restricting access to specific widgets through enabling and disabling them. The logic for the enabling and disabling of widgets remains on the UI Controller 206, but the logic to determine whether a user has access to a specific functionality is located in the Security object 802 in the form of business rules. The UI Controller 206 calls the IsOperAuthorized method in order to set the state of its widgets.

Server

Server security is implemented by restricting access to the data in three different ways:

Server Security Method

Server Components 222 call the IsOperAuthorized API in the Architecture before executing every operation. In all cases the Security object 802 returns a boolean, according to the user's access rights and the business rules SQL Filtering Includes security attributes, like claim sensitiveness or public/private file note, into the SQL statements when selecting or updating rows. This efficiently restricts the resulting data set, and avoids the return of restricted data to the client.

Description

Any GUI related security is implemented at the Client using the Security object 802. The information is available both at the Client Profile and Business Objects 207 which enables the security rules to be properly evaluated.

IsOperAuthorized is called to set widgets upon the loading of a UI or if there is a change of state within the UI.

User authentication always is used by the Application Objects 202 in order to validate user privilege to launch the application.

SQL Filtering is used in the cases where sensitive data must not even be available at the Client, or where there is a great advantage on reducing the size of the data set returned to the Client.

SQL Filtering is only used in very rare cases where performance is a serious concern. It is used carefully in order to avoid increased complexity and performance impacts because some queries can be cumbersome and embedding security on them could increase complexity even more.

Security Framework

Overview

The Security object 802 serves the purpose of holding hard coded business rules to grant or deny user access for various application functions. This information is returned to the UI controllers 206 which make the necessary modifications on the UI state. The ClientProfile object serves the purpose of caching user specific (and static) security information directly on the client. This information is necessary to evaluate the business rules at the Security object 802.

Relationships

Figure 9:
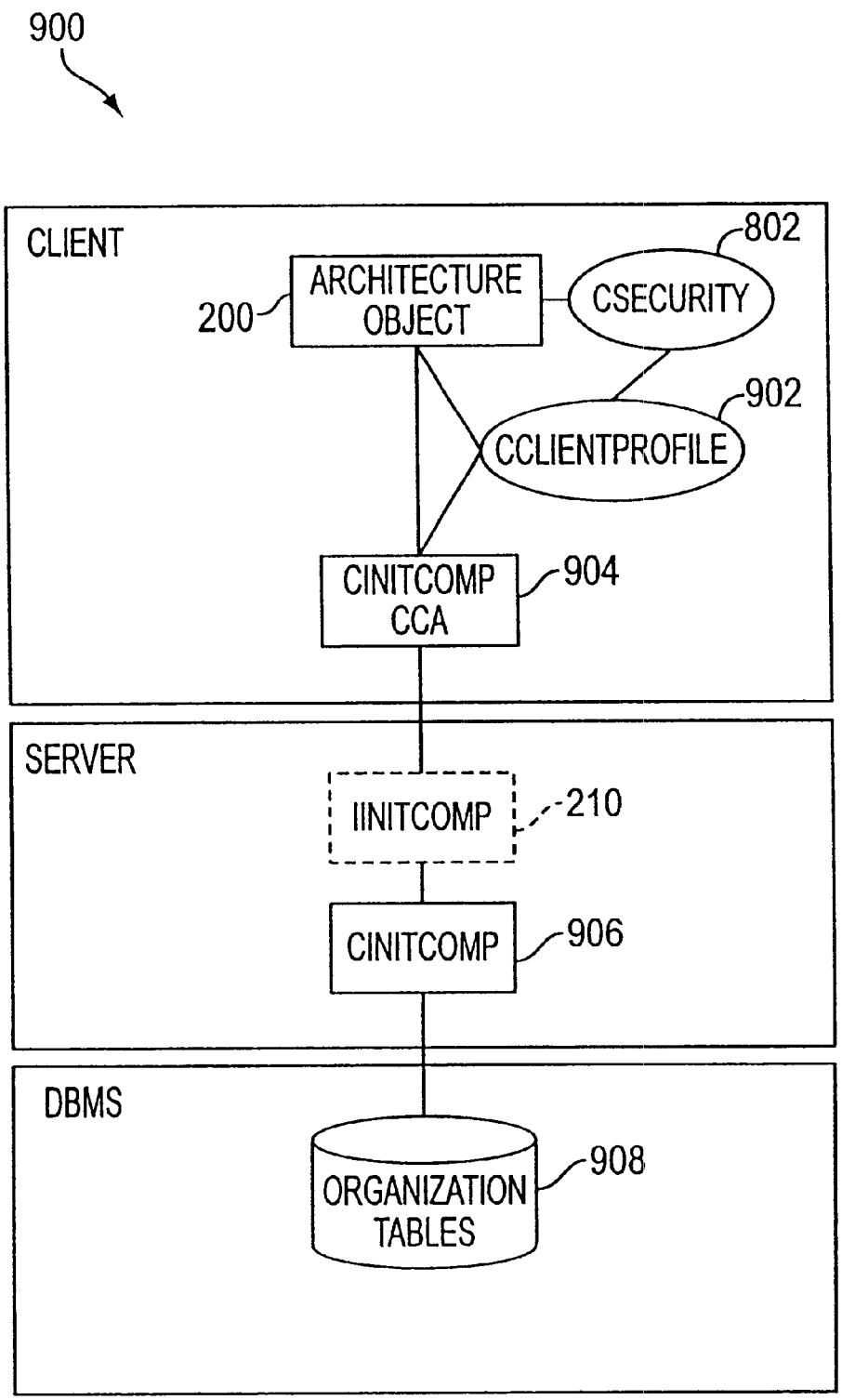
FIG. 9 is an illustration showing the relationships between the security element and other elements.

FIG. 9 shows the relationships between the security element and other elements.

Architecture Object

The TechArch object is responsible for providing access and maintaining the state of the ClientProfile 902 and Security objects 802. The ClientProfile object 902 is instantiated and destroyed in the TechArch's initialization and terminate methods, respectively. This object is maintained through an instance variable on the TechArch object.

CInitCompCCA

The CInitCompCCA object 904 provides two services to the architecture object 200, it serves as an access point to the CInitComp Server 906, and it Marshalls the query result set into a ClientProfile object 902.

CInitComp

The CInitComp server object 906 provides data access to the data that resides in the organization tables 908. This data is useful on the client to determine level of access to data based on hard coded business rules.

Organization Tables

The Organization tables 908 contain user, employee and unit information necessary to build the hierarchy of information necessary to determine level of access to sensitive information.

Client Profile

The ClientProfile object 902 serves the purpose of caching static, user specific security information directly on the client. This information is necessary to determine data access level of information to the user, which is accomplished by passing the necessary values to the Security object 802.

Security Object

The Security Object 802 contains business rules used to determine a user's access privileges in relation to specific functions. The object accepts certain parameters passed in by the various UI Controllers 206 and passes them to through the business rule logic which, in turn, interrogates the Client Profile object 902 for specific user information.

Client Profile

Attributes

The following are internal attributes for the Client Profile object 902. These attributes are not exposed to the application and should only be used by the Security object 802:

sProfile:
  This attribute is passed by the legacy application at start-up and contains the user's TSIds, External Indicator, Count of Group Elements and Group Elements. It is marshalled into these attributes by request of the application objects.

colSpecialUsers:
  This attribute caches information from a table containing special users which do not fit into one of the described roles, such as Organization Librarian. (e.g., Vice President or CEO of the corporation.)

sTSId:
  This is the current users' TSId, and it corresponds to his/her Windows NT Id. It is used to get information about the current logged on user from the Organizational Tables 908.

sEmployeeId:
  This corresponds to the user's employee Id, as stored in the Organizational tables 908. It is used against the passed in employee Id, in order to check relationship between performers and the current user.

sEmployeeName, sEmployeeFirst, sEmployeeMI and sEmployeeLast:
  All these attributes correspond to the current user's name.

dictClientPrivileges:
  This attribute contains a collection of identifiers that indicate what role/authority an individual plays/possesses. This value is used to identify the static role of the logged in user.

These values are used for security business logic which grants or denies access based on whether the user is internal or external, or whether the user is in a given administrative role. Existing values are the following:

SC—Indicates sensitive Claim authority
CC—Indicates Change Claim status authority
MT—Indicates maintain F&C Templates authority
MO—Indicates maintain Organization authority
MR—Indicates maintain Roles authority The following are the proposed additions:

TA—Indicates authority to execute Task Assistant
FN—Indicates authority to execute FileNotes
CH—Indicates authority to execute Claim History
TL—Indicates authority to maintain Task Templates dictProxyList:
  This attribute contains an employees' reporting hierarchy. It is used to determine whether the current user/employee has permission to perform some action based on his/her relationship to other users/employees within their hierarchy. A business example of this is the case of a supervisor, who has rights to view information that his/her subordinates have access to. The relationship API's make use of dictProxyList to determine if the user assigned to the information is super or subordinate of the current user.

boolInternal:
  This attribute indicates whether the logged in user is external or internal. It is also marshalled from the sProfile attribute, passed in by the legacy application.

Public Methods

The following are the APIs exposed by the Client Profile object. These APIs are used for security checking by the Security object and should not be used by the developers in any portion of the application.

GetAuthorizedEmployees As Collection
  This function returns a collection of employee Ids from the employees supervised by the current user.

IsSuperOf(sUserId) As Boolean
  This API returns true if the logged in user is a super of the passed in user Id. It looks up the sUserId value inside the dictProxyList attribute.

IsRelativeOf(sUserId) As Boolean
  This API returns true if the passed in user Id corresponds to either the logged in user or someone from the dictProxyList.

IsInternal As Boolean
  This API is used to grant or restrict the user to information based on whether the data is private to the organization whether the user is internal or external.

IsInRole(sRole) As Boolean
  This API looks up the appropriate sRole value contained within the dictClientRoles attribute to determine whether the current user is authorized to perform that role.

The following accessors are used to get data from the Client Profile's object:
UserId: returns sTSId
EmployeeId: return sEmployeeId
EmployeeName: returns sEmployeeName
EmployeeFirstName: returns sEmployeeFirst
EmployeeLastName: returns sEmployeeLast
EmployeeMiddleInitial: returns sEmployeeMI
ExpandTree: returns boolExpandTreePreference
TemplatePathPreference: returns sTemplatePathPreference

Security Object
Public Methods

The following API is exposed by the Security Object and is used by the application for security checking:

IsOperAuthorized(vMsg As Variant, nOperations As cmOperations, vContext As Variant) as Boolean
This API will return true or false depending on what is returned from the business rule functions to determine user access levels. This API is called on two situations:
1. When setting the initial state before loading the form. If a security requirement exists, IsOperAuthorized is called for the appropriate operation.
2. After any relevant change on the UI state. For example, when a sensitive claim is highlighted on the Task Assistant window. A relevant change is one which brings the need for a security check.

The valid values for the enumeration and the correspondent context data are:
cmnMaintainFormsCorr (none)
cmRunEventProcessor (none)
cmWorkOnSensitiveClaim (a Claim object)
cmMaintainPersonalProfile (none)
cmMaintainWorkplan (none)
cmDeleteFileNote (a File Note object)
cmMaintainTaskLIbrary (none)
cmMaintainOrg (none)

Server Security APIs

IsSVCOperAuthorized(vMsg As Variant, sOperations As String, vContext As Variant) as Boolean
This API is called by every method on the server that persists data or can potentially access sensitive data (reactive approach).

IsOperAuthorized(vMsg As Variant, nOperations As cmOperations, vContext As Variant) as Boolean
This API is available for those cases where a proactive security check is needed on the server.

Implementation Examples

The following examples show some ways to implement the options described above:

Client
  Business Logic
    IsOperAuthorized

Let's consider the case of the Task Assistant window, where the user should not be allowed to view any information on a sensitive claim if he/she is not the claim performer or the performer's supervisor. The following code would be at the Controller:

```
Private Sub TaskTree_NodeChanged(. . . .)
    myController.SetCurrentTask
    myController.SetState
End Sub
Private Sub SetState()
    Dim objSecurity as Object
    Dim vContext(1) as Object
    Set objSecurity = taaApp.taoArch.objSecurity
    vContext(0) = CurrentClaim
    vContext(1) = CurrentTask
    tlbEditIcon.Enabled =
        objSecurity.IsOperAuthorized(vMsg, cmWorkOnSensitiveClaim, vContext)
End Sub
```

Let's consider the case of the Maintain Correspondence Search window where only a user who is a Forms and Correspondence Librarian should be allowed to delete a template. The following code would be at the Controller:

```
Private Sub SetWindowMode()
    Dim objSecurity as Object
    Set objSecurity = taaApp.taoArch.objSecurity
    . . .
    tlbEditIcon.Enabled = objSecurity.IsOperAuthorized(vMsg,
    cmMaintainFormsCorr)
End Sub
```

Server
  SQL Filtering:
    Let's consider the example of the Draft File Note window, where a user can only look at the draft file notes on which he/she is the author. At the controller, one would have:

```
Public Sub GetDraftFNotes()
    Dim objCP as Object
    Set objCP = taoArch.objClientProfile
    Dim fntCCA as Object
    Set fntCCA = taaApp.taoArch.GetCCA(cmCCAFileNote)
    Call fntCCA.GetADraftFNote(vMsg, objCP.sOrgUserId, colFNotes)
End Sub
```

And at the Component, the SQL statement would be:

```
Select nFNoteId,
    sFNoteAuthor,
    dFNoteFinal,
    :
    :
    From File Note
    Where sFileNoteSts = 'D'
    And sFNoteAuthor = sAuthor
```

Task Engine Application

This application runs on the server as a background process or service with no direct interaction with Client applications, so it doesn't need any GUI related security. Basically, its main actions are limited to the generation of new tasks in response to externally generated events or, more specifically, it:
Reads static information from the Task Template tables;
Reads events from the Event tables;
Inserts tasks on the Task table.

In this sense, its security is totally dependent on external entities as described below:

The Task Library application is the entrance point for any changes on the Task Template database tables. It will make use of the options described above in order to fulfill its security requirements.

Events are generated from legacy applications, so the Task Engine relies completely on the security implemented for these applications in order to control the generation of events.

Another level of security for event generation relies on the Database authorization and authentication functions. Only authorized components have access to the database tables (this is valid for all the other applications as well).

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A computer program embodied on a computer readable medium for developing component based software, comprising:
    a data component that stores, retrieves and manipulates data utilizing a plurality of functions;
    an adapter component that transmits and receives data to/from the data component;
    a business component that serves as a data cache and includes logic for manipulating the data; and
    a controller component adapted to handle events generated by a user utilizing the business component to cache data and the adapter component to ultimately persist data to a data repository.

2. The computer program as recited in claim 1, wherein the computer program includes a plurality of components.

3. The computer program as recited in claim 2, wherein the computer program includes one or more user interface code segments adapted for collecting data and events from a user.

4. The computer program as recited in claim 2, wherein the computer program includes one or more server components that persist data to a data repository.

5. The computer program as recited in claim 1, wherein the computer program includes an adapter component that utilizes an address lookup table for determining an address to transmit data to a server.

6. The computer program as recited in claim 2, wherein the computer program includes one or more application management components to provide one or more dialogs for handling events.

7. The computer program as recited in claim 2, wherein the computer program includes one or more controller component code segments adapted for providing validation within a logical unit of work.

8. The computer program as recited in claim 4, wherein the computer program includes one or more controller component code segment containing logic to interact with one or more business components.

9. The computer program as recited in claim 2, wherein the computer program includes logic for dynamically instantiating additional business components.

10. The computer program as recited in claim 2, wherein the computer program includes one or more controller component code segments adapted for interacting with one or more adapter components to add, retrieve, modify, or delete one or more business objects.

11. The computer program as recited in claim 2, wherein the computer program includes logic for providing dirty flag processing to notify users of change processing.

12. A computer program embodied on a computer readable medium for creating a component based architecture, comprising:
    a user interface form code segment adapted for collecting data from a user input;
    a business object code segment adapted for caching data;
    an adapter code segment adapted for transmitting data to a server; and
    a controller component code segment adapted for handling events generated by the user interacting with the user
    interface code segment, providing validation within a logic unit of work, containing logic to interact with a business component, creating one or more business objects, interacting with an adapter component to add, retrieve, modify, or
    delete business objects, and providing dirty flag processing to notify a user of change processing.

13. The computer program as recited in claim 12, further comprising an architecture component adapted to provide architecture services selected from the group of services comprising accessing codes from one or more code tables; logging messages; handling errors; providing security services; providing performance statistics; providing data manipulation functions; managing date formats and providing a single point of entry for architecture services.

14. The computer program as recited in claim 12, further comprising an application component adapted for instantiating the controller component; passing data to the controller component; invoking services selected from the group of services comprising initializing the controller component, initializing the user interface code segment, and initializing the architecture component; and managing open windows for the purpose of coordinating a shutdown process.

15. The computer program as recited in claim 12, wherein the user interface code segment is adapted for presenting a graphical interface to a user, informing the controller component of user actions, and providing data validation.

16. The computer program as recited in claim 12, wherein the business component contains information about a business entity to maintain the integrity of the business entity, encapsulates business rules that pertain to the business entity, maintains relationships with one or more business objects, provides validation of data, and provides calculated or derived data.

17. The computer program as recited in claim 12, wherein the adapter component marshals data contained in recordsets returned by the server into business objects and masks remote requests from one or more controller components.

18. A computer program embodied on a computer readable medium for creating a component based architecture for allowing communication between a plurality of clients and a server, comprising:
    one or more client components included with each client, each client component of each client adapted for communicating and manipulating data with a first data type;
    one or more server components adapted for communicating and manipulating data with a second data type; and
    one or more adapter components included with each client for translating data from the one or more client components to the second data type when communicating data from the client to the server and further translating data from the one or more server components to the first data type when communicating data from the server to the client:

wherein the adapter component marshals data contained in recordsets
returned by the server into business objects and masks remote requests
from one or more controller components.

19. The computer program as recited in claim 18, wherein the server component is independent of any client component and the adapter component manages the interface between the server component and other components.

20. The computer program as recited in claim 18, wherein the server component performs the data persistence functions.

* * * * *

UNITED STATES PATENT AND TRADEMARK OFFICE
CERTIFICATE OF CORRECTION

PATENT NO. : 6,574,636 B1
DATED : June 3, 2003
INVENTOR(S) : Richard E. Balon et al.

It is certified that error appears in the above-identified patent and that said Letters Patent is hereby corrected as shown below:

Column 6,
Line 59, delete "H," and substitute -- H. -- in its place.

Column 8,
Line 28, immediately after "modules" insert -- . -- (period).

Column 16,
Line 45, delete "Node" and substitute -- Mode -- in its place.

Column 18,
Line 26, immediately before "handle" insert -- ' -- (apostrophe).

Column 19,
Line 50, immediately before "make" insert -- ' -- (apostrophe).

Column 22,
Line 52, delete "adds or full updates" and substitute -- adds or full updates -- in its place.

Column 23,
After line 30, insert a new line as follows: --: -- (colon).

Column 24,
Line 18, delete "egual" and substitute -- equal -- in its place.

Column 27,
Line 38, delete "task TimeStamp" and substitute -- task.TimeStamp -- in its place.

Column 28,
Line 18, delete "1NeWTimestamp" and substitute -- 1NewTimeStamp -- in its place.
Line 27, delete "Setcomplete" and substitute -- SetComplete -- in its place.

Column 29,
After line 51, insert a new line as follows: -- : --.
Line 53, insert -- ' -- (apostrophe) before "let".

Column 30,
Line 10, delete "…" and substitute -- ……… -- in its place.

UNITED STATES PATENT AND TRADEMARK OFFICE
CERTIFICATE OF CORRECTION

PATENT NO.      : 6,574,636 B1
DATED           : June 3, 2003
INVENTOR(S)     : Richard E. Balon et al.

It is certified that error appears in the above-identified patent and that said Letters Patent is hereby corrected as shown below:

Column 32,
Line 19, delete "UIs" and substitute -- UI's -- in its place.
Lines 23 and 24, delete "(e.g. ., "May 16, 1998")" and substitute -- (e.g., "05/16/98") -- in its place.
Lines 25 and 26, delete "eg.,., "May 16, 1998")" and substitute -- (e.g., "16/05/98") -- in its place.
Line 29, delete "Sheridan Calendar Widgets" and substitute -- *Sheridan Calendar Widgets* -- in its place.

Column 34,
Line 36, delete "Requires New:" and substitute -- Requires New: -- in its place.
Line 37, "Requires Existing:" and substitute -- Requires Existing: -- in its place.
Line 40, "Requires Existing:" and substitute -- Requires Existing: -- in its place.
Line 44, delete "Not Supported:" and substitute -- Not Supported: -- in its place.

Column 43,
Line 37, insert -- ' -- (apostrophe) before "language".
Line 38, insert -- ' -- (apostrophe) before "localized".
Line 39, insert -- ' -- (apostrophe) before "English".
Line 40, insert -- ' -- (apostrophe) before "abbreviated".
Line 41, insert -- ' -- (apostrophe) before "native".

Column 48,
Line 41, after "current" insert -- user is in a certain role --.

Column 52,
Line 10, delete "(erg.," and substitute -- (e.g., -- in its place.

Column 57,
Lines 27-29, first table, fourth entry for "Value 3", under column "Name", delete "audit purposes"; under column "Description", delete "occurrencefor logging and information" and substitute -- occurrence for logging and audit purposes -- in its place; under column "Example" after "Developer debugging" insert -- information --.

Column 58,
Line 27, immediately after "declaring" delete "," (comma).
Lines 30-31, delete "develOpment" and substitute -- development -- in its place.

UNITED STATES PATENT AND TRADEMARK OFFICE
CERTIFICATE OF CORRECTION

PATENT NO. : 6,574,636 B1
DATED : June 3, 2003
INVENTOR(S) : Richard E. Balon et al.

It is certified that error appears in the above-identified patent and that said Letters Patent is hereby corrected as shown below:

Column 63,
In the title of the table, delete "Ccmponents" and substitute -- Components -- in its place in both occurrences.
In the table, column 3, second entry, under column "Server Components" delete "INSERT INTO Custcmer" and substitute -- INSERT INTO Customer -- in its place.

Column 70,
Line 4, immediately after "Authentication" insert -- : -- (colon).
Line 12, immediately after "UI Controllers" insert -- : -- (colon).

Column 71,
Line 23, delete "908contain" and substitute -- 908 contain -- in its place.

Column 73,
Line 34, delete "cmnMaintainFormsCorr" and substitute -- cmMaintainFormsCorr -- in its place.

Signed and Sealed this

Tenth Day of August, 2004

JON W. DUDAS
*Acting Director of the United States Patent and Trademark Office*